(12) United States Patent
Hanna

(10) Patent No.: US 8,965,064 B2
(45) Date of Patent: Feb. 24, 2015

(54) SYSTEMS AND METHODS FOR CAPTURING ARTIFACT FREE IMAGES

(75) Inventor: Keith J. Hanna, New York, NY (US)

(73) Assignee: EyeLock, Inc., Tolima Valley Caguas, PR (US)

( * ) Notice: Subject to any disclaimer, the term of this patent is extended or adjusted under 35 U.S.C. 154(b) by 227 days.

(21) Appl. No.: 13/590,898

(22) Filed: Aug. 21, 2012

(65) Prior Publication Data
US 2013/0051631 A1  Feb. 28, 2013

Related U.S. Application Data

(60) Provisional application No. 61/525,984, filed on Aug. 22, 2011.

(51) Int. Cl.
*G06K 9/00* (2006.01)

(52) U.S. Cl.
CPC ................. *G06K 9/00604* (2013.01)
USPC ........... 382/117; 382/103; 382/274; 382/275; 382/299; 351/208; 351/206

(58) Field of Classification Search
CPC .......... G06K 9/00604; G06K 9/00597; G06K 9/00255; G06K 9/2027; A61B 3/112; A61B 5/117; A61B 3/113; G06T 2207/30041; H04N 5/23219

USPC .......... 382/117, 275, 103, 274, 299; 651/208, 651/206

See application file for complete search history.

(56) References Cited

U.S. PATENT DOCUMENTS

2011/0001929 A1*  1/2011  Tawada ......................... 351/208

* cited by examiner

*Primary Examiner* — Mike Rahmjoo
(74) *Attorney, Agent, or Firm* — Cooley LLP

(57) ABSTRACT

The present disclosure is directed towards methods and systems for capturing artifact-free biometric images of an eye. The eye may be in motion and in the presence of partially-reflective eyewear. The method may include acquiring, by a first sensor, a first image of an eye while the eye is illuminated by a first illuminator. The first image may include a region of interest. The first sensor may be disposed at a fixed displacement from the first illuminator and a second sensor. The second sensor may acquire, within a predetermined period of time from the acquisition of the first image, a second image of the eye. The second image may include the region of interest. An image processor may determine if at least one of the first and second images include artifacts arising from one or both of the first illuminator and eyewear, within the region of interest.

20 Claims, 31 Drawing Sheets

Side view of user

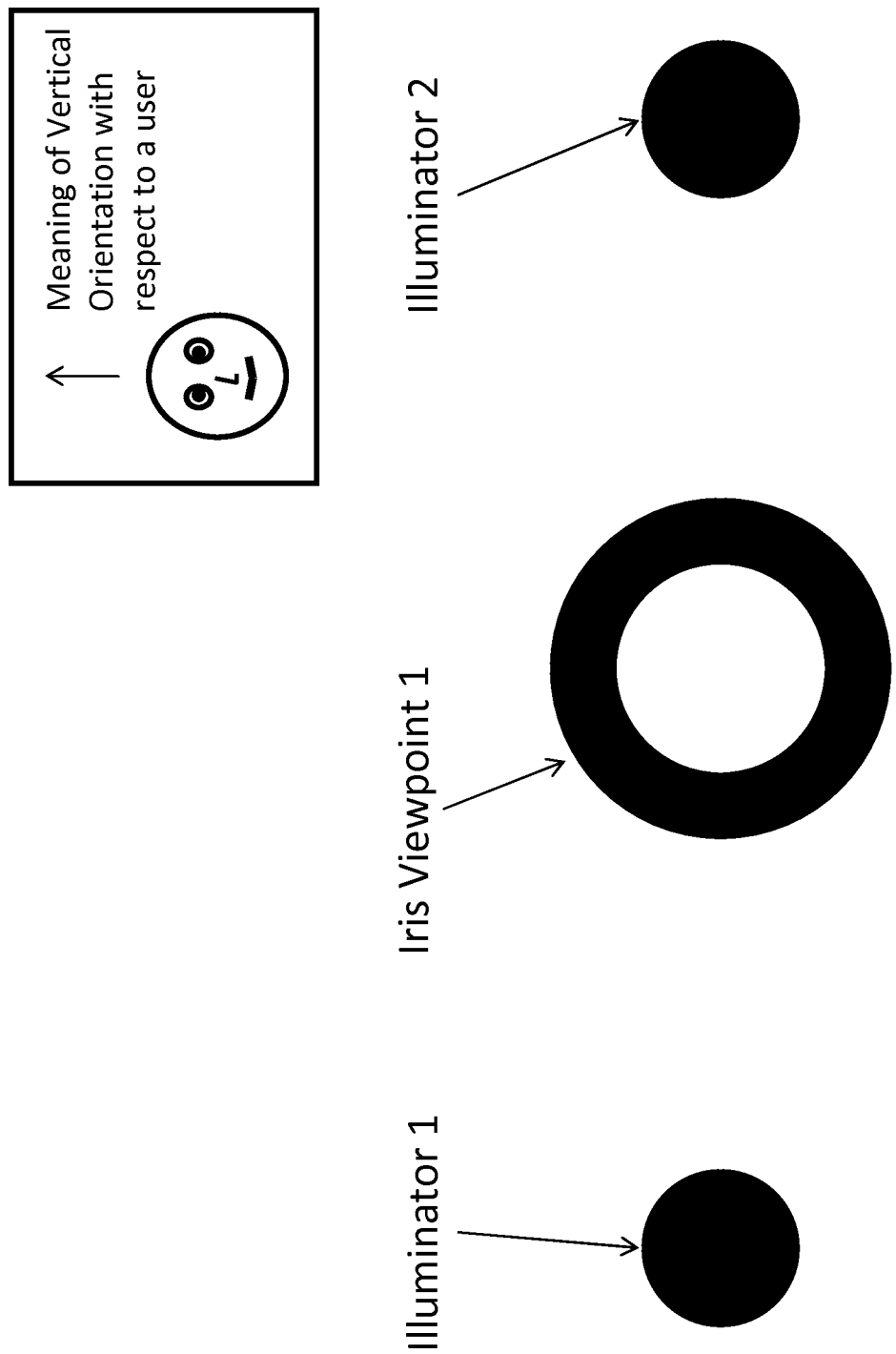

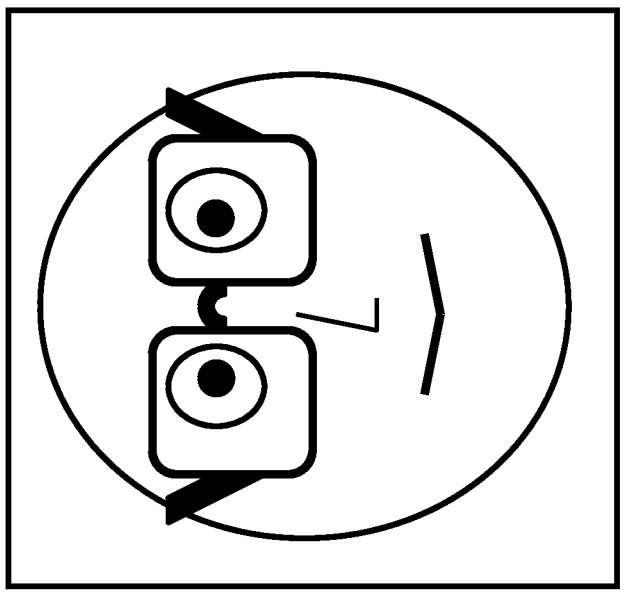
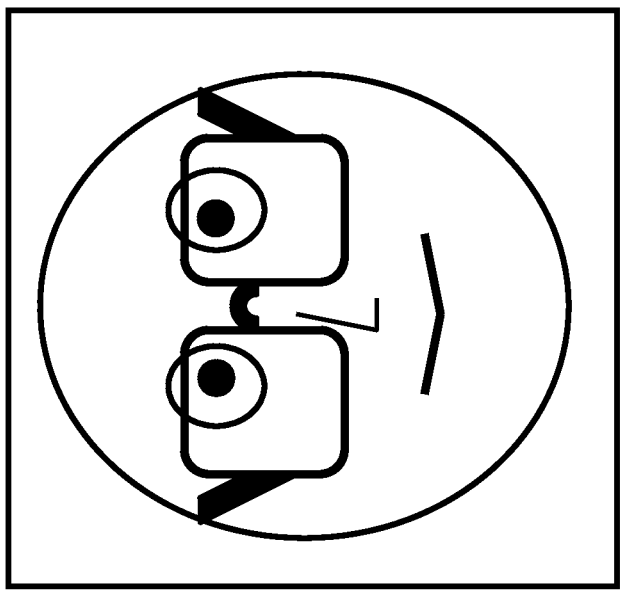
Image Acquired from Viewpoint 1    Image Acquired from Viewpoint 2
Figure 19

SYSTEMS AND METHODS FOR CAPTURING ARTIFACT FREE IMAGES

RELATED APPLICATION

The present application claims the benefit of and priority to U.S. Provisional Patent Application No. 61/525,984, entitled "Capturing Specular Free Images", filed Aug. 22, 2011, which is incorporated herein by reference in its entirety for all purposes.

FIELD OF THE DISCLOSURE

The present disclosure relates to identity verification technologies, and more specifically to systems and methods for capturing artifact free images.

BACKGROUND

Biometric recognition methods are widespread and are of great interest in the fields of security, protection, financial transaction verification, airports, and office buildings. The iris in particular is a leading method of performing biometric recognition, although other biometrics such as retinal characteristics may be employed. A challenge in capturing biometrics from an individual's eye is that features that are a biometric area of interest, such as the iris, can be obscured or distorted by portions of eyewear such as the frames of glasses, and/or discontinuities of eyewear lenses. Moreover, specular reflections derived from illuminators, such as those for illuminating an eye for biometric capture, may reflect off a visor or glass lenses and obscure or distort captured images. Such illuminators, mounted relative to a biometric sensor, may at times be at a sub-optimal position due to a subject's head tilt and therefore orientation of the eyewear.

SUMMARY

In certain aspects, the present disclosure is directed to systems and methods for capturing images free of artifacts within a region of interest on a subject's eye, particularly when the eye is moving with respect to the biometric acquisition device. By using various configurations of one or more sensors and/or one or more illuminators, the likelihood of acquiring images of the eye area, or portions thereof, that are unaffected by artifacts may be improved or maximized. At the same time, these configurations can reduce or minimize the physical size or footprint of a corresponding biometric acquisition device, including the maximum horizontal and/or vertical dimensions of the biometric acquisition device.

In one aspect, the present disclosure is directed to a method of acquiring artifact-free biometric images of an eye in motion with respect to the sensor, and in the presence of partially-reflective eyewear. The method may include acquiring, by a first sensor, a first image of an eye while the eye is illuminated by a first illuminator. The first image may include a region of interest. The first sensor may be disposed at a fixed displacement from the first illuminator and a second sensor. The second sensor may acquire, within a predetermined period of time from the acquisition of the first image, a second image of the eye. The second image may include the region of interest. An image processor may determine if at least one of the first and second images include artifacts arising from one or both of the first illuminator and eyewear, within the region of interest.

In some embodiments, the first sensor acquires the first image of the eye while illuminated by the first illuminator. The first sensor may be vertically displaced with respect to the second sensor. The second sensor may acquire, simultaneous with the acquisition of the first image, the second image of the eye, the second image including the region of interest. The first sensor may acquire a third image of the eye while illuminated by a second illuminator. The second illuminator may be disposed at a predefined distance from the first illuminator. The first sensor may acquire, within a predetermined time from the acquisition of the first image, a third image of the eye while illuminated by a second illuminator, the second illuminator disposed at a vertical distance from the first illuminator. The second sensor may acquire a fourth image of the eye while illuminated by the second illuminator.

In certain embodiments, the arrangement of the first and the second sensors on a biometric device may be such that the optical axes of the first and the second sensors converge at substantially a nominal distance, D, between the eye and the sensors. The biometric device may tilt the first and the second sensor at an angle, Theta, from a line connecting the eye and a midpoint between the first and second sensors, according to Theta=a Tan(0.5*S/D), wherein S is a separation distance between the first and the second sensors, and D is a distance from the eye to the midpoint between the first and second sensors.

In some embodiments, the image processor may select, based on the determination, at least a portion of the region of interest, from one or both of the first and second images, for use in biometric verification. The image processor may combine the at least a portion of the region of interest selected, for biometric verification. The image processor may determine if at least one of the first and second images include specular reflection off the eyewear within the region of interest, the specular reflection arising from the first illuminator. The image processor may determine if at least one of the first and second images include at least one of: obstruction from a non-lens portion of the eyewear, discontinuity in a lens of the eyewear, and distortion from a rim of the lens.

In another aspect, the present disclosure is directed to a system of acquiring artifact-free biometric images of an eye in motion and in the presence of partially-reflective eyewear. The system may include a first illuminator. The system may include a first sensor and a second sensor. The first sensor may acquire a first image of an eye while illuminated by a first illuminator. The first image may include a region of interest. The first sensor may be disposed at a fixed displacement from the first illuminator and a second sensor. The second sensor may acquire a second image of the eye within a predetermined period of time from the acquisition of the first image, the second image including the region of interest. An image processor may determine if at least one of the first and second images include artifacts arising from one or both of the first illuminator and eyewear, within the region of interest.

In some embodiments, the first sensor may be vertically displaced with respect to the second sensor. The second sensor may acquire, simultaneous with the acquisition of the first image, the second image of the eye. The first sensor may acquire a third image of the eye while illuminated by a second illuminator, the second illuminator disposed at a predefined distance from the first illuminator. The system may include a second illuminator. The first sensor may acquire, within a predetermined time from the acquisition of the first image, a third image of the eye while illuminated by the second illuminator. The second illuminator may be disposed at a vertical distance from the first illuminator. The second sensor acquires a fourth image of the eye while illuminated by the second illuminator.

In certain embodiments, the first and the second sensors may be arranged such that the optical axes of the first and the second sensors converge at substantially a nominal distance, D, between the eye and the sensors. The first and the second sensors may be arranged such that the optical axes of the first and the second sensors are tilted at an angle, Theta, from a line connecting the eye and a midpoint between the first and second sensors, according to Theta=a Tan(0.5*S/D), wherein S is a separation distance between the first and the second sensors, and D is the distance from the eye to the midpoint between the first and second sensors.

In some embodiments, the image processor selects, based on the determination, at least a portion of the region of interest, from one or both of the first and second images, for use in biometric verification. The image processor may combine the at least a portion of the region of interest selected, for biometric verification. The image processor may determine if at least one of the first and second images include specular reflection off the eyewear within the region of interest, the specular reflection arising from the first illuminator. The image processor may determine if at least one of the first and second images include at least one of: obstruction from a non-lens portion of the eyewear, discontinuity in a lens of the eyewear, and distortion from a rim of the lens.

In yet another aspect, the present disclosure is directed to a method of acquiring artifact-free biometric images of an eye in motion and in the presence of partially-reflective eyewear. The method may include acquiring, by a first sensor, a first image of an eye while the eye is in a first position relative to the sensor and illuminated by a first illuminator. The first image may include a region of interest. The first sensor may be disposed at a fixed displacement from the first illuminator. The first sensor may acquire, within a predetermined time from the acquisition of the first image, a second image of the eye while the eye is in a second position and illuminated by the first illuminator. The second image may include the region of interest. An image processor may determine if at least one of the first and second images include artifacts arising from one or both of the first illuminator and eyewear, within the region of interest. The image processor may select, based on the determination, at least a portion of the region of interest, from one or both of the first and second images, for use in biometric verification.

In some embodiments, the second sensor acquires a third image of the eye while illuminated by the first illuminator. The second sensor may be vertically displaced with respect to the first sensor. The second sensor may acquire, within a predetermined time from the acquisition of the third image, a fourth image of the eye while illuminated by the first illuminator. The first sensor may acquire a third image of the eye while illuminated by a second illuminator. The second illuminator may be disposed at a predefined distance from the first illuminator. The first sensor may acquire, within a predetermined time from the acquisition of the first image, a third image of the eye while illuminated by a second illuminator. The second illuminator may be disposed at a vertical distance from the first illuminator.

In certain embodiments, an image processor may select, based on the determination, at least a portion of the region of interest, from one or both of the first and second images, for use in biometric verification. The image processor may combine the at least a portion of the region of interest selected, for biometric verification. The image processor may determine if at least one of the first and second images include specular reflection off the eyewear within the region of interest, the specular reflection arising from the first illuminator. The image processor may determine if at least one of the first and second images include at least one of: obstruction from a non-lens portion of the eyewear, discontinuity in a lens of the eyewear, and distortion from a rim of the lens.

BRIEF DESCRIPTION OF THE DRAWINGS

The following figures depict certain illustrative embodiments of the methods and systems described herein, where like reference numerals refer to like elements. Each depicted embodiment is illustrative of these methods and systems and not limiting.

FIG. 2 shows one embodiment of a system in which a camera (or viewpoint) is positioned between two substantially horizontal illuminators;

FIG. 6 depicts an example embodiment of a view from a bottom viewpoint with a top left illuminator turned on;

FIG. 19 depicts one embodiment of imagery captured from a top viewpoint and from a bottom viewpoint;

DETAILED DESCRIPTION

Figure 1A:
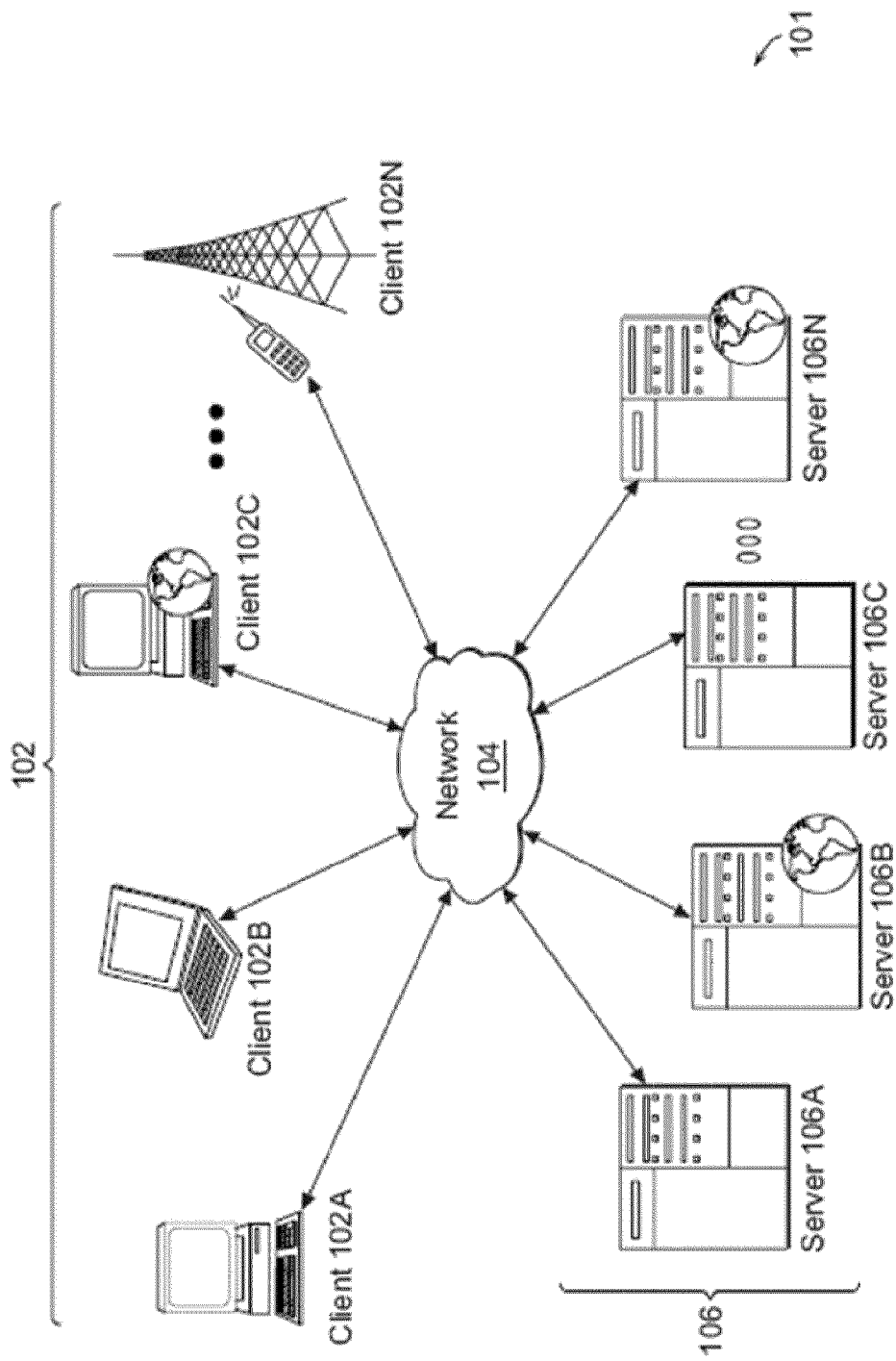
FIG. 1A is a block diagram illustrative of an embodiment of a networked environment with a client machine that communicates with a server.

Before addressing other aspects of the systems and methods for capturing or creating artifact free images, a description of system components and features suitable for use in the present systems and methods may be helpful. Some of these system components and features may be incorporated into biometric devices or systems, such as in image acquisition and/or processing modules. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include a device or appliance installed between the server(s) 106 and client machine(s) 102. This appliance can mange client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; or any other protocol able to transmit data among mobile devices.

Figure 1B:
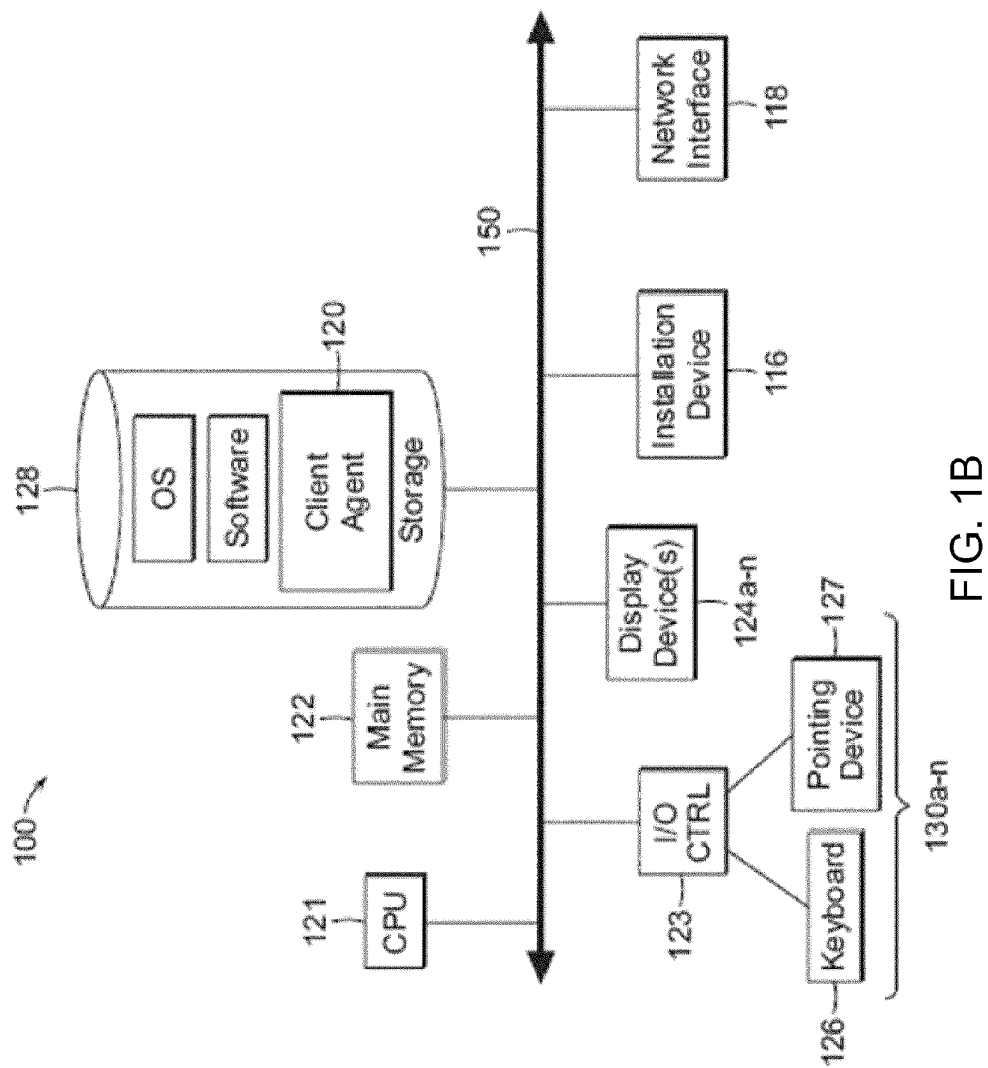
FIGS. 1B and 1C are block diagrams illustrative of embodiments of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
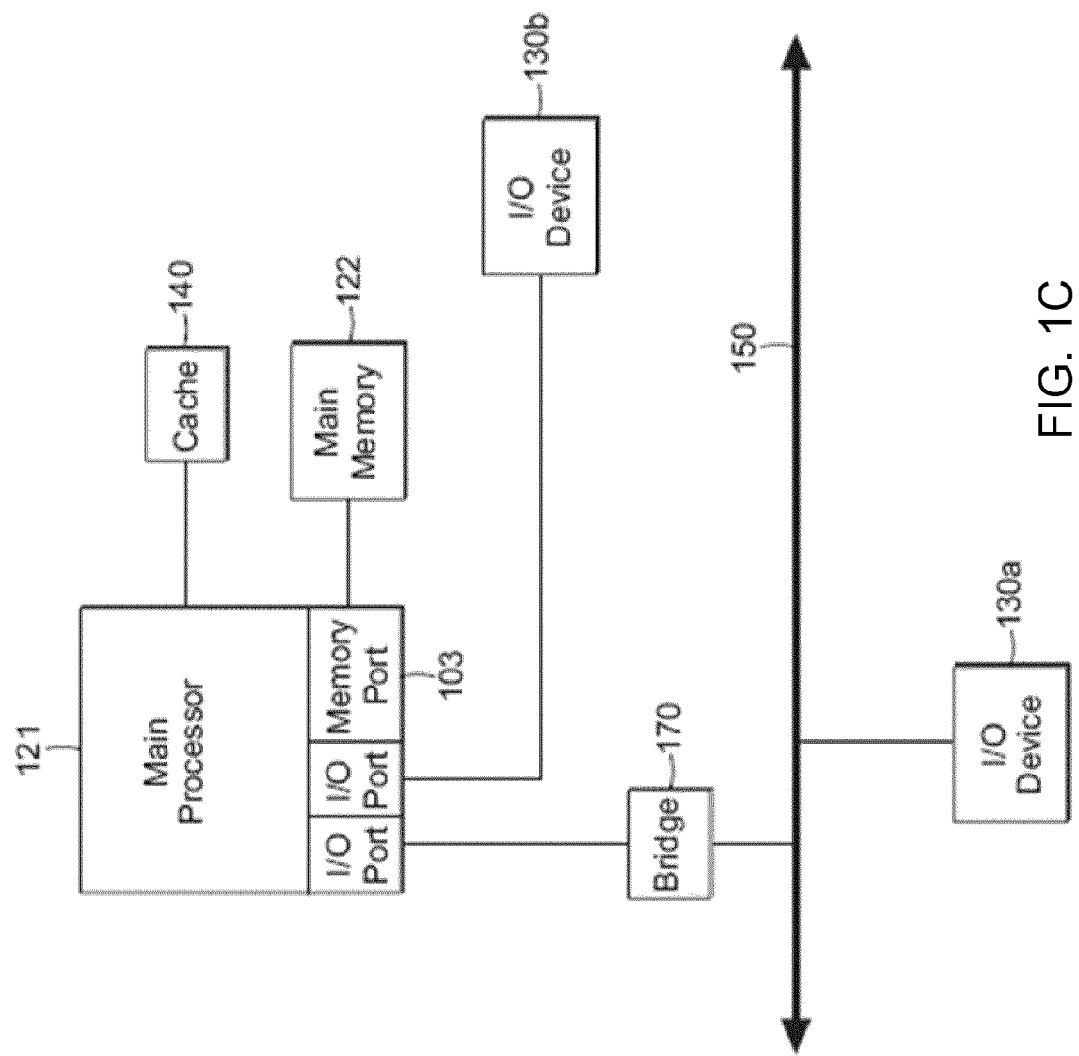

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices;

or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

Having described embodiments of computing devices and environments that may be suitable for the methods and systems for capturing artifact free images, certain embodiments of the methods and systems will be described in detail.

Figure 3A:
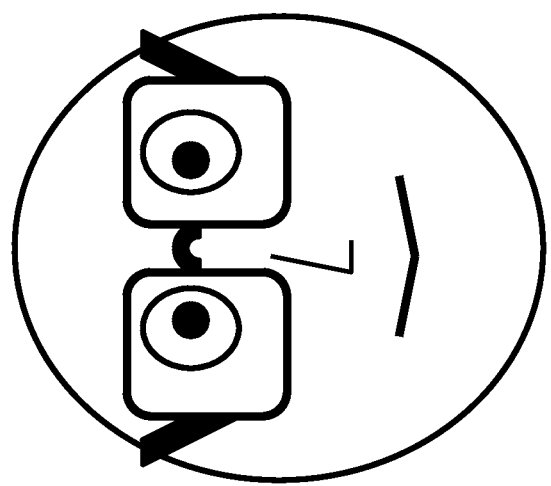
FIG. 3A shows one embodiment of a frontal view of a user with eyewear.
Figure 3B:
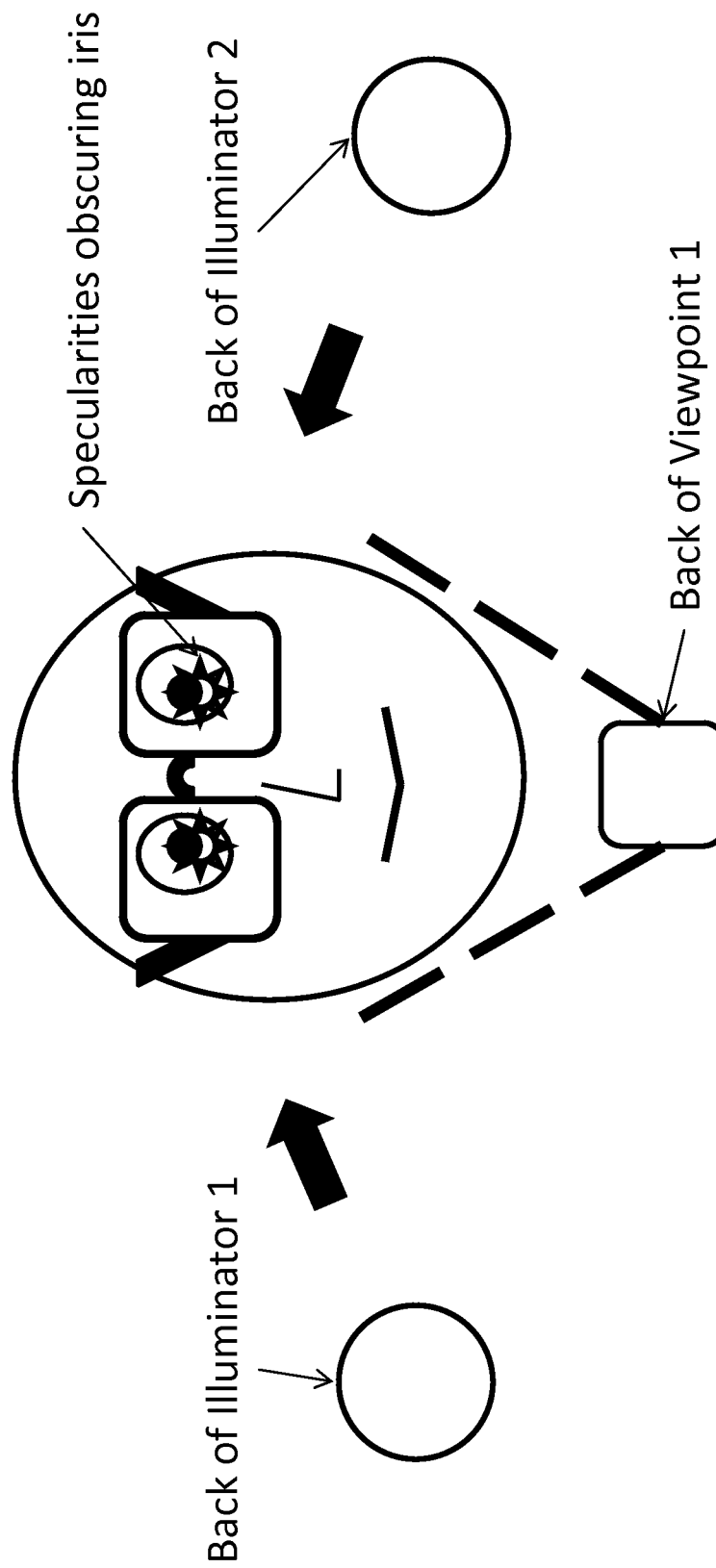
FIG. 3B shows one embodiment of specular reflections off eyewear obscuring the iris in acquired imagery.

Biometric devices may include a camera (or viewpoint) and one or more illuminators, such as the embodiment shown in FIG. 2. The term "viewpoint" is used, in part, to reflect the possibility that a camera sensor may be located in one position, and optical means such as prisms and mirrors can be used to shift the optical viewpoint to a different position. A viewpoint may comprise an image capture region or volume, from the perspective of a camera or sensor. Each viewpoint may also correspond to a separate camera or sensor position concurrent with, or sequential to another viewpoint. Therefore, N viewpoints may be captured by deploying up to N cameras or sensors. FIG. 3A shows one embodiment of a frontal view of a user wearing eyewear such as spectacles. FIG. 3B, in the top center, shows for the configuration in FIG. 1, one embodiment of a view observed from the viewpoint with the illuminators turned on. Depending on the pitch (angle about a horizontal axis) of the user's head and the pitch of the optical surfaces of the spectacles, specular reflections from the illuminators can reflect directly off the surface of the optical surfaces of the spectacles and back into the viewpoint captured as an image, thereby obscuring the iris in the image acquired by a biometric acquisition device.

Figure 4:
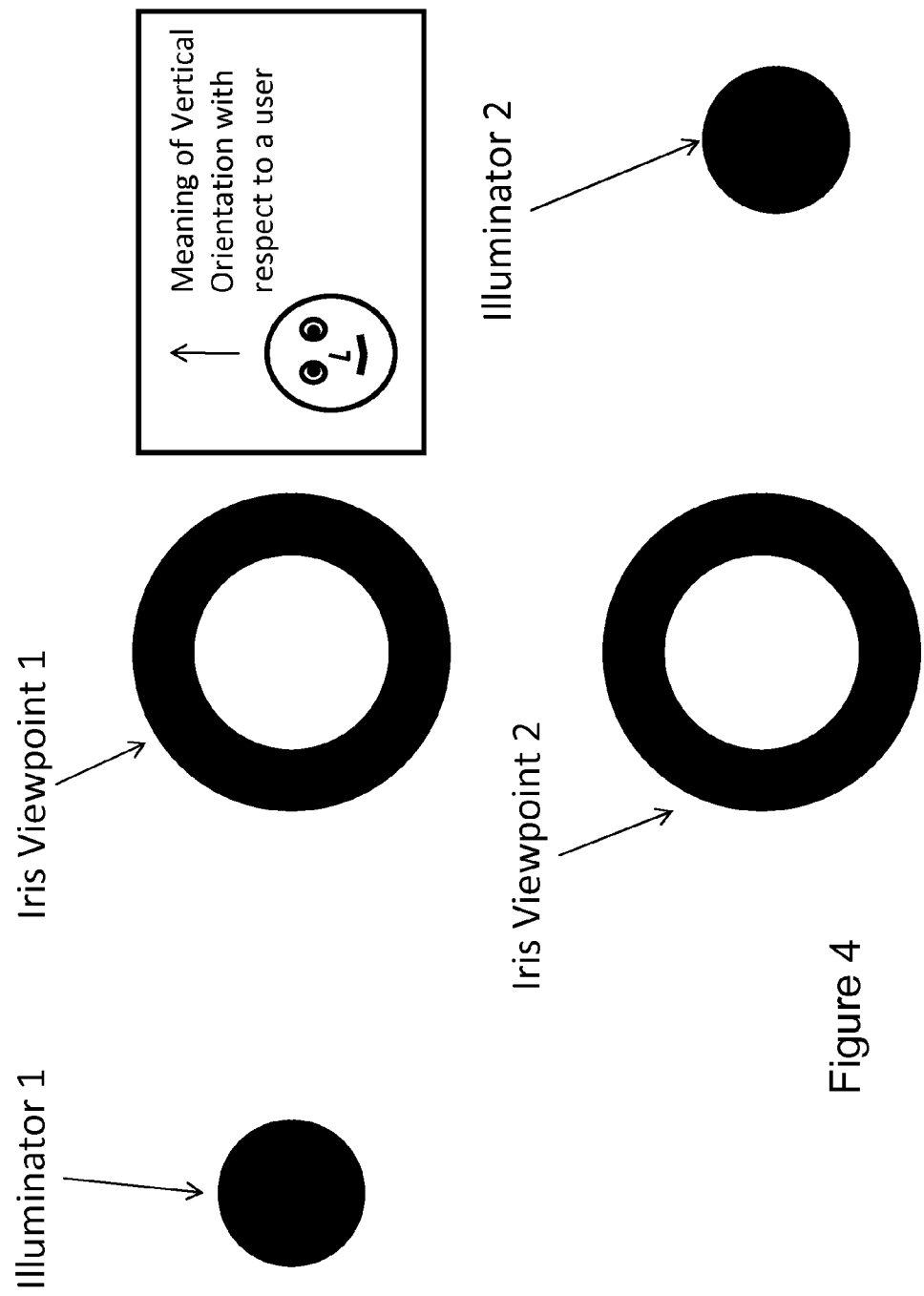
FIG. 4 depicts one embodiment of a system comprising two viewpoints at substantially different vertical positions and two illuminators at substantially different horizontal and vertical positions.

FIG. 4 shows one particular configuration of the disclosed methods and systems for capturing artifact free images, which will be used for illustration. In this configuration there are two viewpoints oriented vertically with each other such that the first viewpoint is at the top and the second viewpoint is at the bottom. in some embodiments, there are also two discrete illuminator positions positioned to the left and right of each respective camera, as shown. Specular reflections may occur when the orientation of spectacles are such that illumination from the illuminator reflects directly off the surfaces of the spectacles directly into the camera viewpoint. The orientation of the spectacles may not easily be controlled to address the problem since it may be a function of the way that the user tilts the user's head, as well as the pitch of the optical surfaces of the spectacles themselves. Instead, in one configuration of the system, embodied in a biometric acquisition device, the camera viewpoint may be controlled, such as employing two or more viewpoints at different vertical locations to acquire imagery at the same time from each viewpoint and/or camera. In this way, for a given tilt orientation of the spectacles, the specular reflection can appear in a different vertical position in each viewpoint.

In another configuration of the system, we may employ two or more discrete illuminators with different vertical positions, simultaneously acquiring images from one or more viewpoints. Since the illuminators are at different vertical positions, from a given viewpoint, the specular reflection appears in a different position if imagery is acquired first with the first discrete illuminator turned on and the second turned off, and then with the second discrete illuminator turned on and the first turned off. One significant advantage of using two viewpoints in substantially different vertical positions (e.g., as oppose to two illuminators) is that imagery from each viewpoint can be acquired at the identical or same time, rather than waiting for the illuminators to be switched or controlled. This is significant when the user is in motion with respect to the biometric device, since in some cases there may be no time to wait for the illuminators to be controlled before the user leaves the capture volume of the biometric acquisition device. One illustrative configuration uses both approaches: two viewpoints that are different at least in the vertical direction, and two discrete illuminators that are also positioned differently at least in the vertical direction. As will be illustrated below, this approach also has the benefit of exaggerating the angular difference between viewpoint, user and illuminator so that significant shifting of specular reflections or other artifacts can be achieved by a minimal size configuration of the biometric acquisition device.

Figure 5:
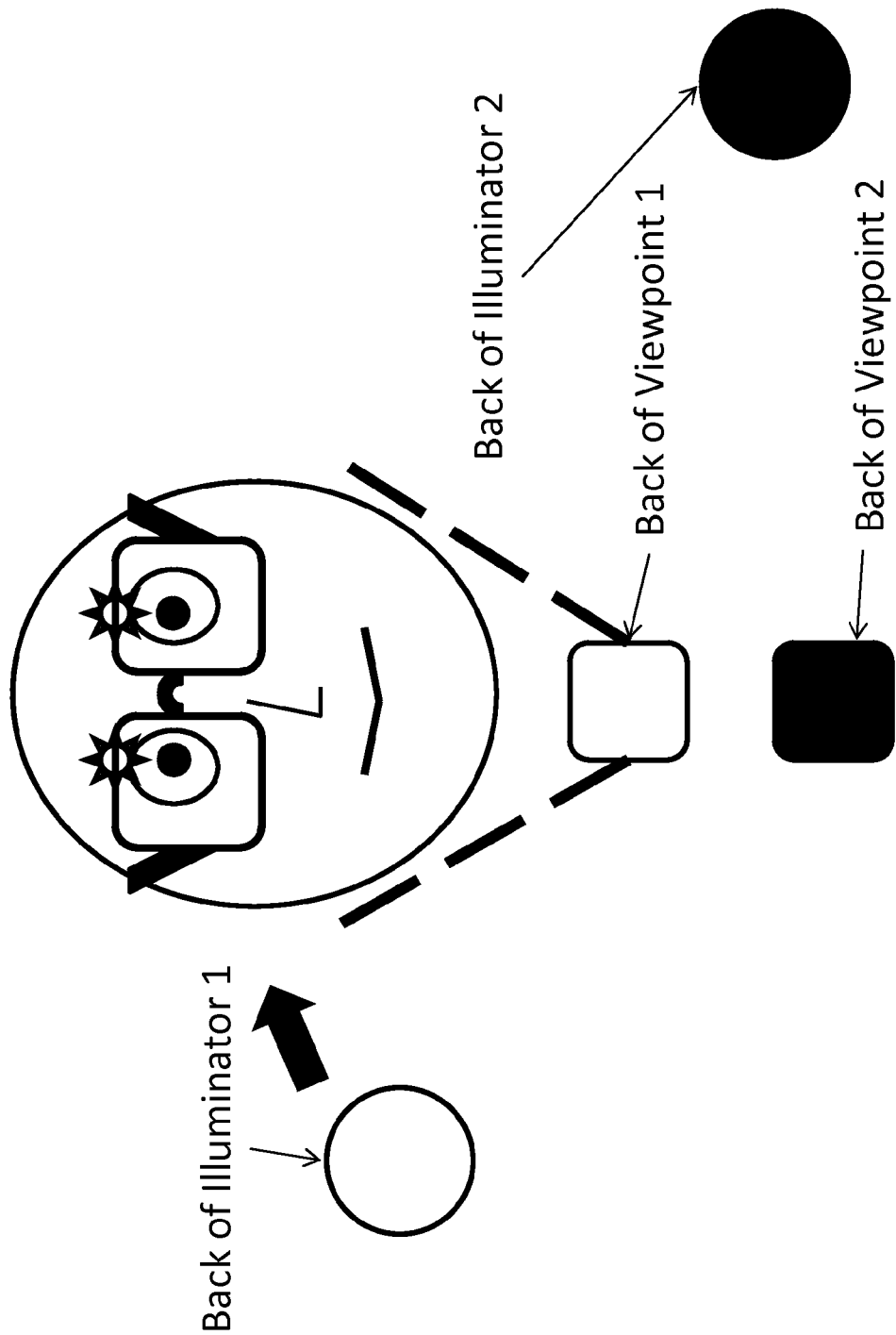
FIG. 5 depicts one embodiment of specular reflections above an iris in imagery acquired from a top viewpoint.
Figure 6:
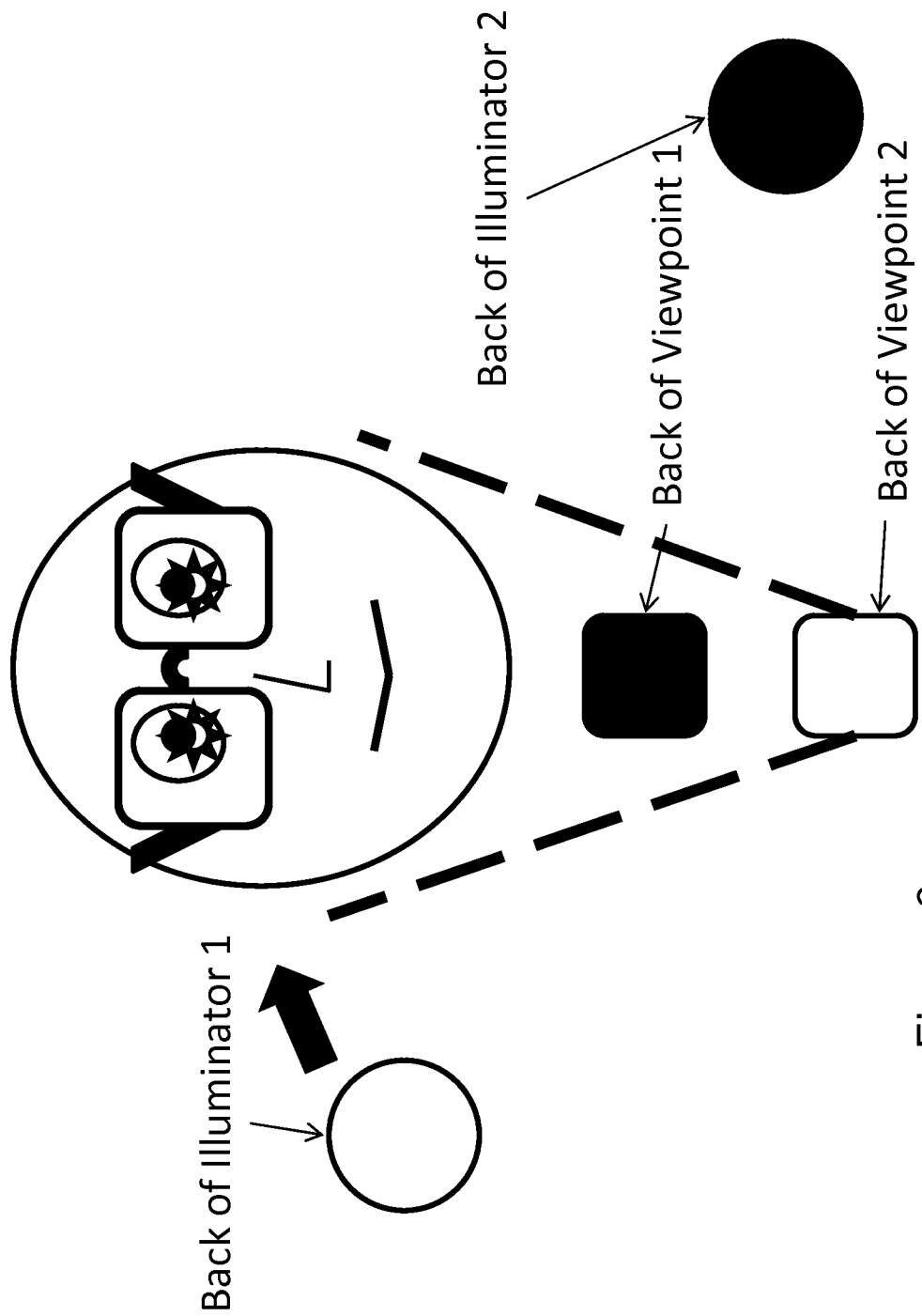
Figure 7:
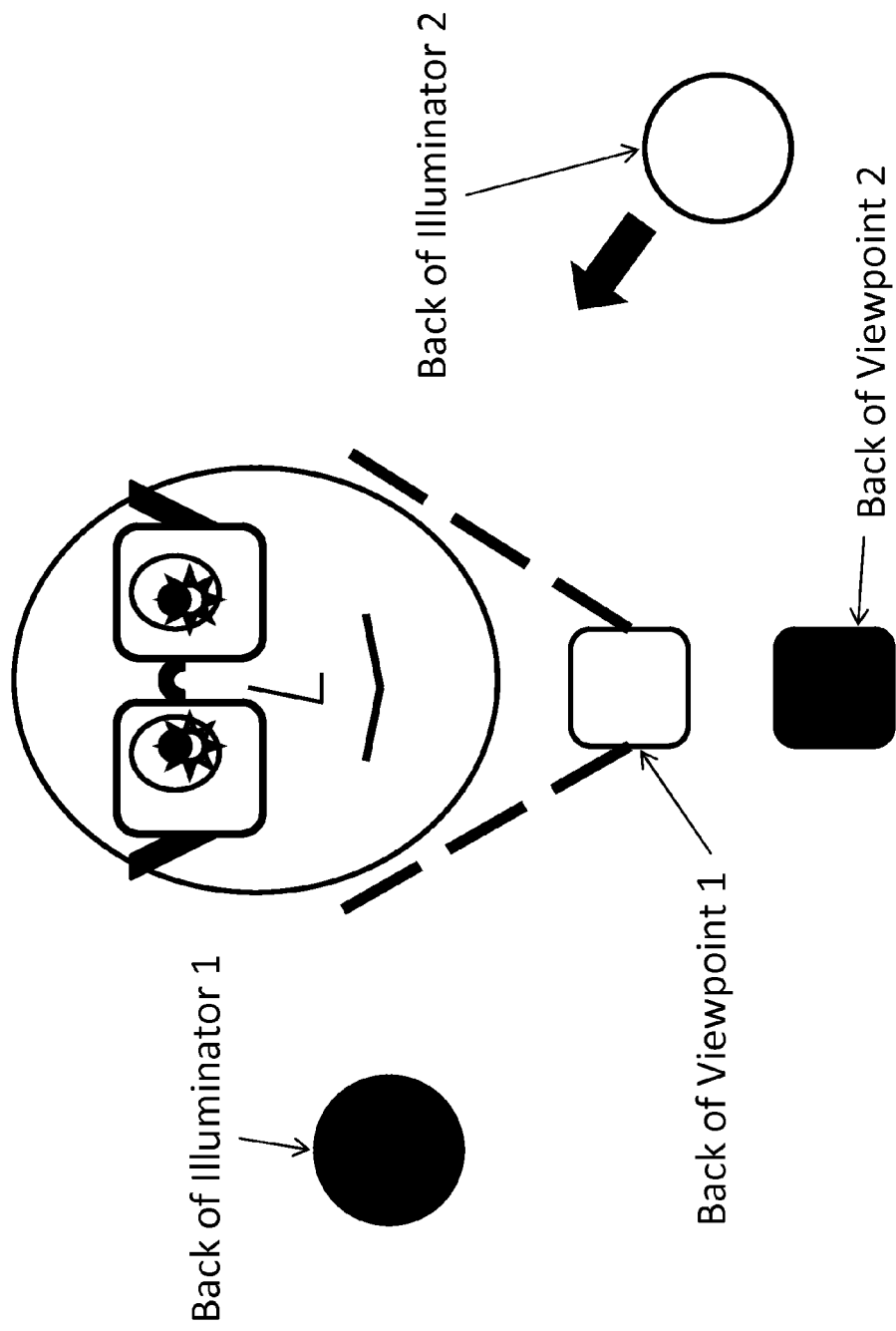
FIG. 7 depicts one embodiment of specular reflections obscuring an iris in imagery acquired from a top viewpoint.

This is now illustrated in more detail via various system embodiments. FIG. 5 shows, for the configuration in FIG. 4, the center view from the top viewpoint with the top left illuminator turned on. In this case, the angle formed between the top left illuminator, the optical surfaces of the spectacles of the user, and the top viewpoint may be such that the specular reflection is above the iris so that the eye area is un-occluded in this case. Note however that this may be a function of the tilt angle of head of the user as well as the tilt angle of the optical surfaces of the spectacles. Note also that the vertical position of the specular reflection may be the same off both the left and right sides of the spectacles since the pitch of the optical material on each side of the spectacles may typically be the same. FIG. 6 shows, in the center of the figure, an example of the view from the bottom viewpoint with top left illuminator turned on. In this case, the angle formed between the top left illuminator, the eyewear (e.g., spectacles) of the user, and the bottom viewpoint may be such that specular reflection is on the iris so the iris may be occluded. FIG. 7 shows, in the center of the figure, an example view from the top viewpoint, which includes specular reflections from the bottom right illuminator. In this case, the angle formed between the bottom right illuminator, the spectacles of the user, and the top viewpoint may be such that the specular reflection is on the iris so it is distorted or occluded in the acquired image.

Figure 8:
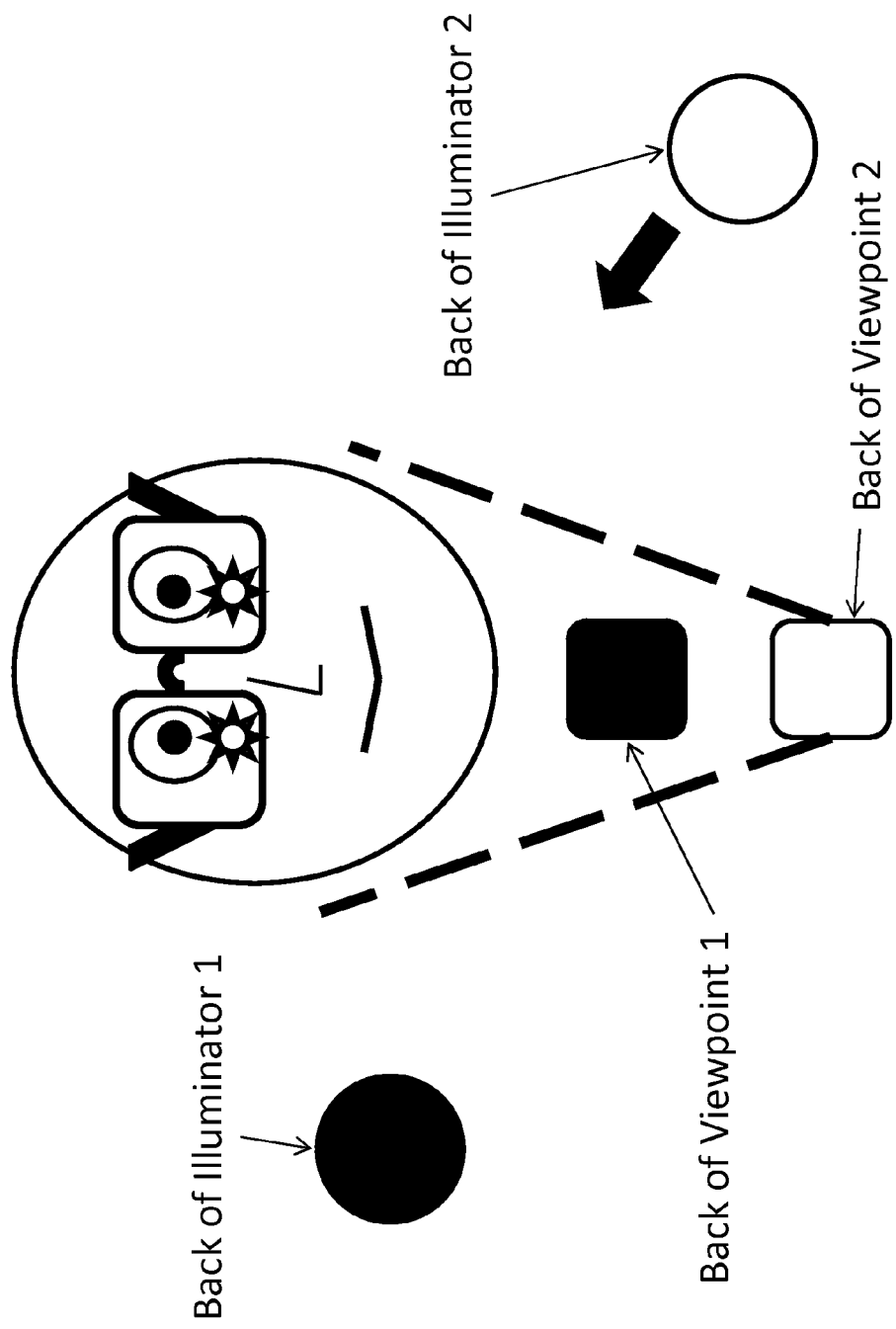
FIG. 8 depicts one embodiment of specular reflections below an iris in imagery acquired from a bottom viewpoint.

FIG. 8 shows, in the center of the figure, an example of the view from the bottom viewpoint with the bottom right illuminator turned on. In this case, the angle formed between the bottom right illuminator, the spectacles of the user, and the bottom viewpoint may be such that the specular reflection occurs below the iris region so that the iris is unoccluded or undistorted in a correspondingly captured image. Thus, for configurations similar to that shown in FIG. 4, by using imagery from at least two different vertical viewpoints, and from using illuminators that are at two different vertical positions, the observed vertical displacement of the specular reflection within captured imagery may be increased given a particular overall size of a biometric device that hosts the illuminators and the sensor, thereby also increasing the probability or opportunity to capture imagery of the eye region that is free of specular reflections and other artifacts.

Figure 9:
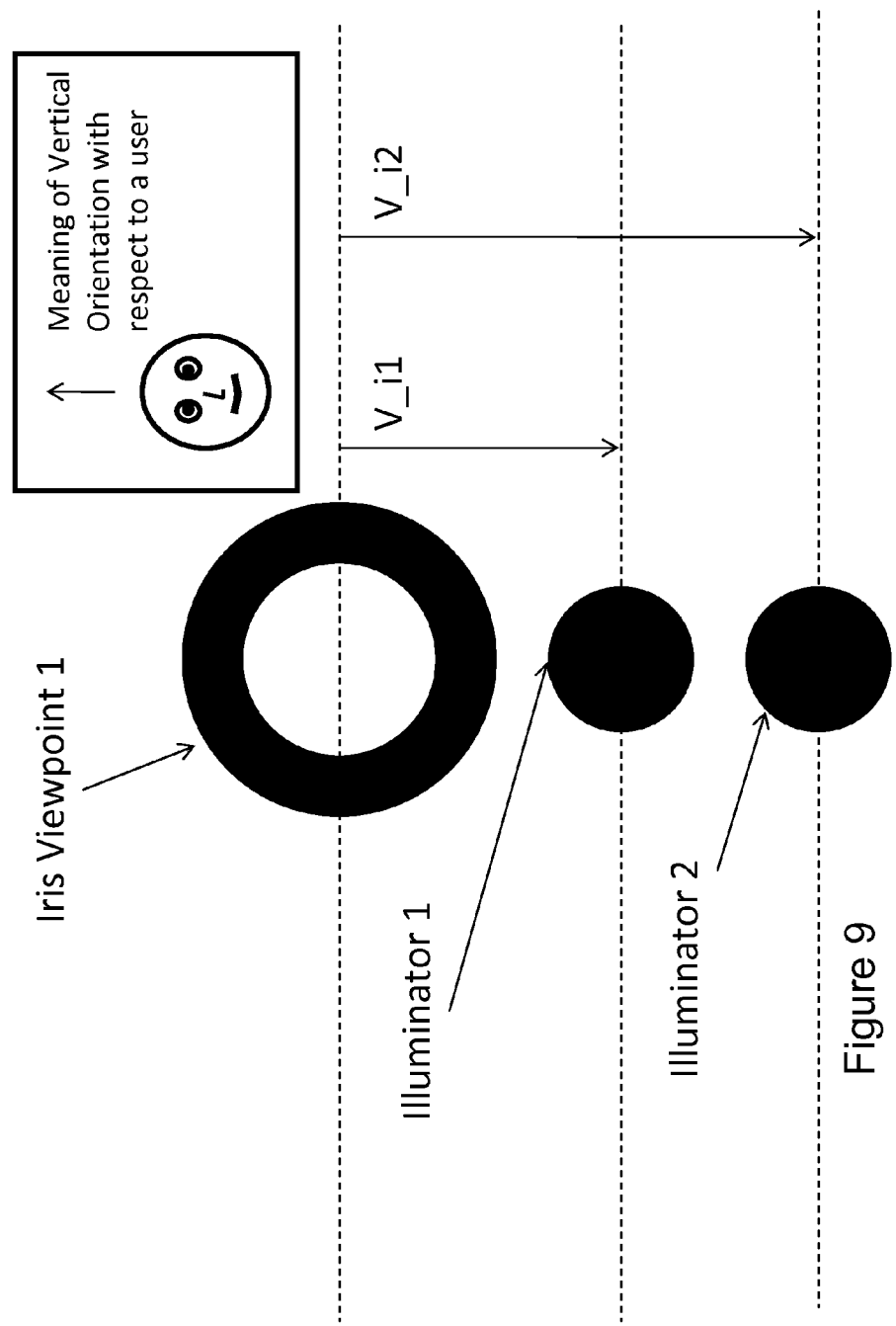
FIG. 9 depicts one embodiment of a system supporting one viewpoint and two illuminators vertically disposed with respect to the viewpoint.
Figure 10:
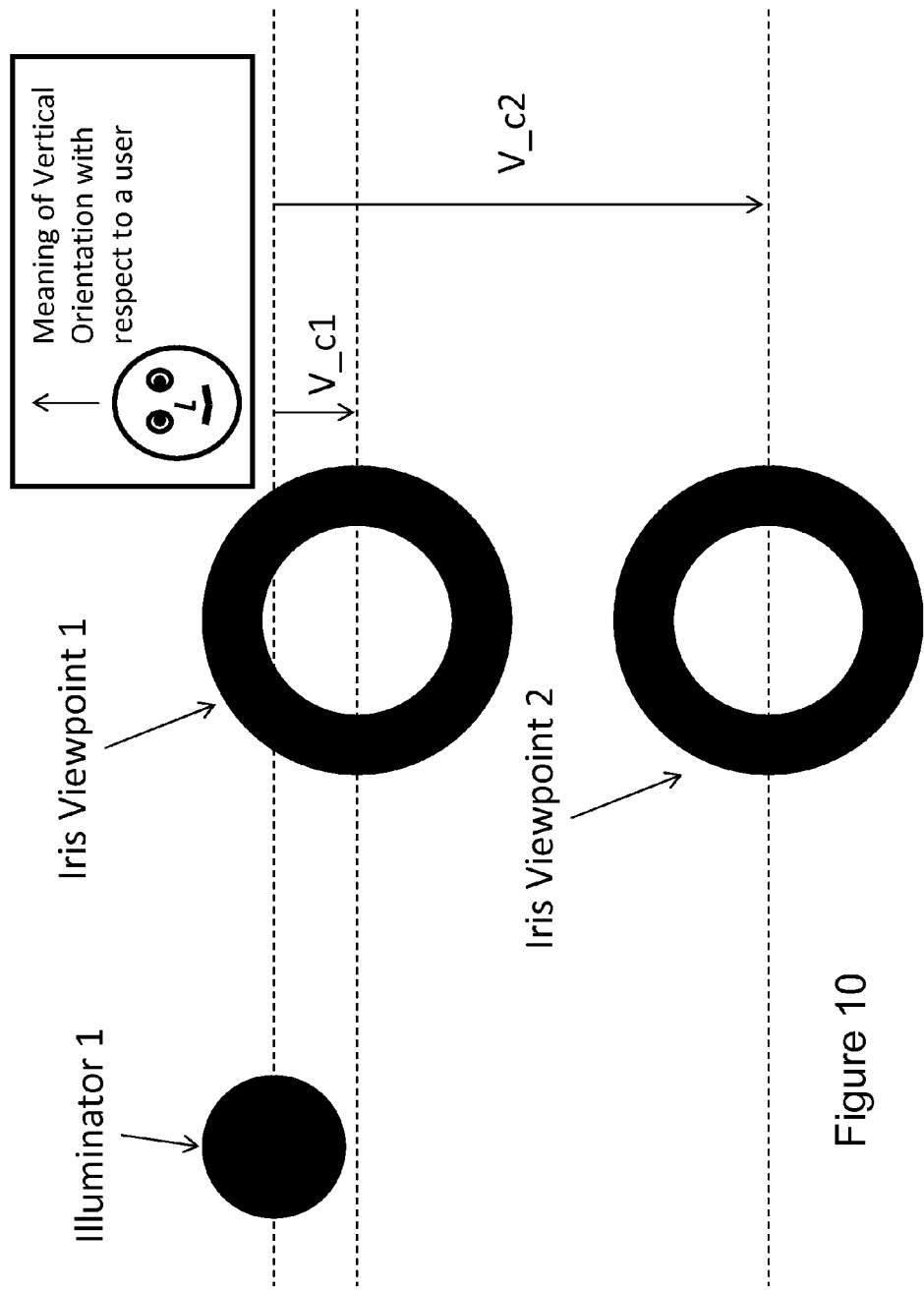
FIG. 10 depicts one embodiment of a system comprising one illuminator and two viewpoints spatially disposed with respect to the illuminator.

FIG. 9 shows another configuration of the system, whereby there is at least one viewpoint and 2 illuminators at a vertical distance $V\_i1$ and $V\_i2$ with respect to the viewpoint. In this case, imagery may be acquired from the given viewpoint first with a first combination of the at least two discrete illuminators being turned on or off, and then second, with a different combination of at least two discrete illuminators being turned on or off. FIG. 10 shows another configuration of the system, whereby there is at least one illuminator and two viewpoints at a vertical distance $V\_c1$ and $V\_c2$ with respect to the illuminator and which may have about the same horizontal distance to the illuminator. Note that with two vertical viewpoints, there can be a benefit even if only one illuminator is used; for example, FIG. 7 shows specular reflections on the iris in imagery acquired from the first viewpoint and with the first illuminator enabled, such that the iris is occluded. FIG. 5 shows that with the same illuminator turned on but using imagery acquired from the second vertical viewpoint, specular reflections may appear above the iris such that the iris is unoccluded. Thus, there can be a benefit from having at least two viewpoints vertically displaced and at least one discrete illuminator, wherein the viewpoints are positioned at substantially different vertical positions with respect to the first illuminator.

Figure 11:
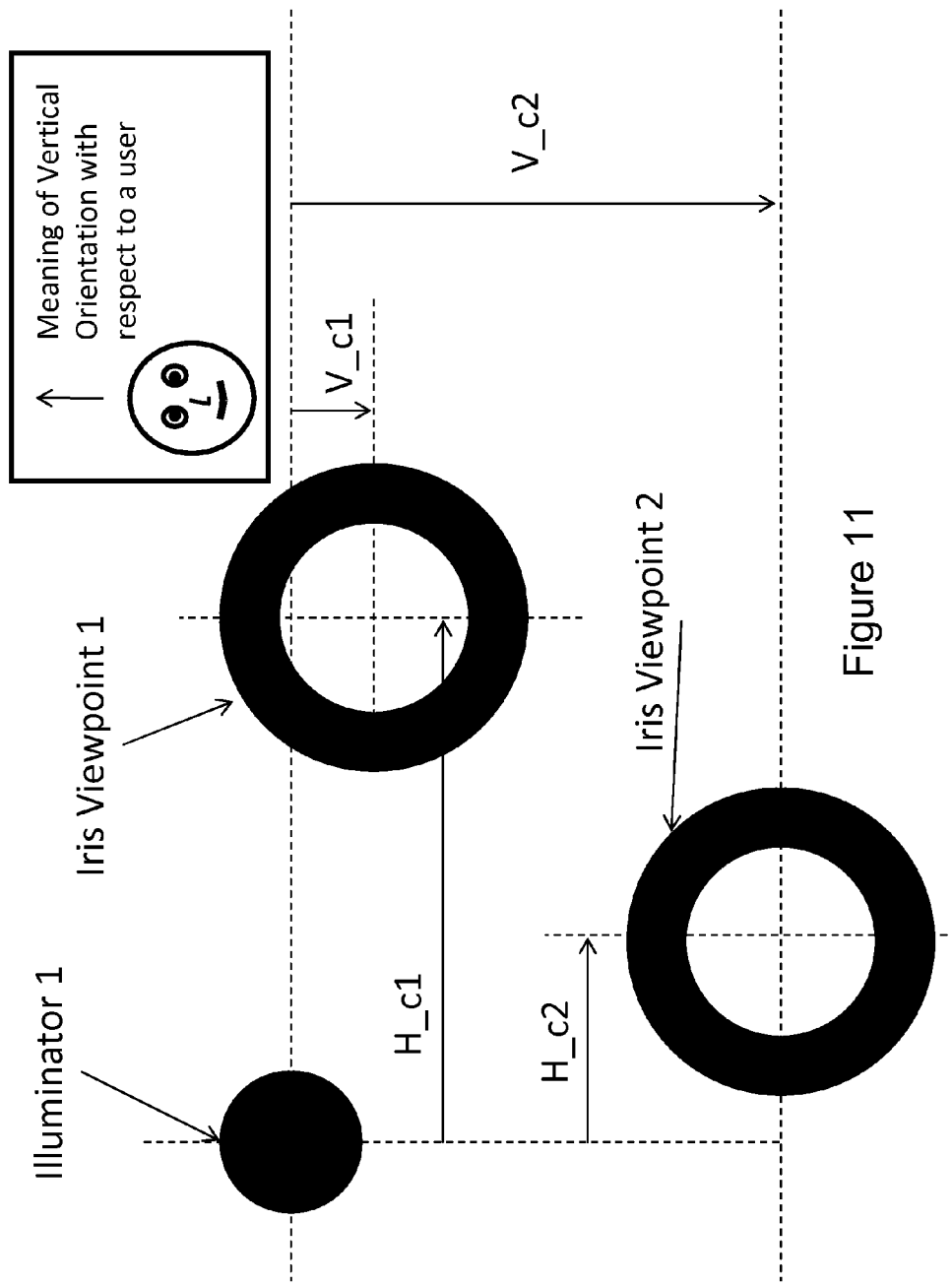
FIG. 11 depicts one embodiment of a system comprising one illuminator and two viewpoints spatially disposed with respect to the illuminator.

FIG. 11 shows another example configuration of the system, whereby there is one illuminator and two viewpoints at a vertical distance $V\_c1$ and $V\_c2$ with respect to the illuminator and at a horizontal distance $H\_c1$ and $H\_c2$ respectively with respect to the illuminator. In one embodiment and for illustration, the two viewpoints are arranged diagonally such that both the vertical and horizontal positions of the viewpoints are both substantially different. In this case, because the viewpoints are positioned at substantially different horizontal positions with respect to the first illuminator as well as at substantially different vertical positions, the distance between the cameras may be increased or maximized given a particular horizontal and vertical dimension of the device. This may increase the observed distance between the observed location of specular reflections in imagery captured from the two locations. This further improves the likelihood that imagery can be captured from at least one of the viewpoints of an unoccluded eye region, while at the same time reducing or minimizing the physical size footprint of the device. In particular, the maximum horizontal or vertical dimension of the device may be reduced. As an example, in one configuration, the vertical and horizontal distances between cameras may be 6 cm and 8 cm respectively. The vertical and horizontal distances between cameras may comprise other values, for example, ranging from 1 cm to 1 m.

Figure 12:
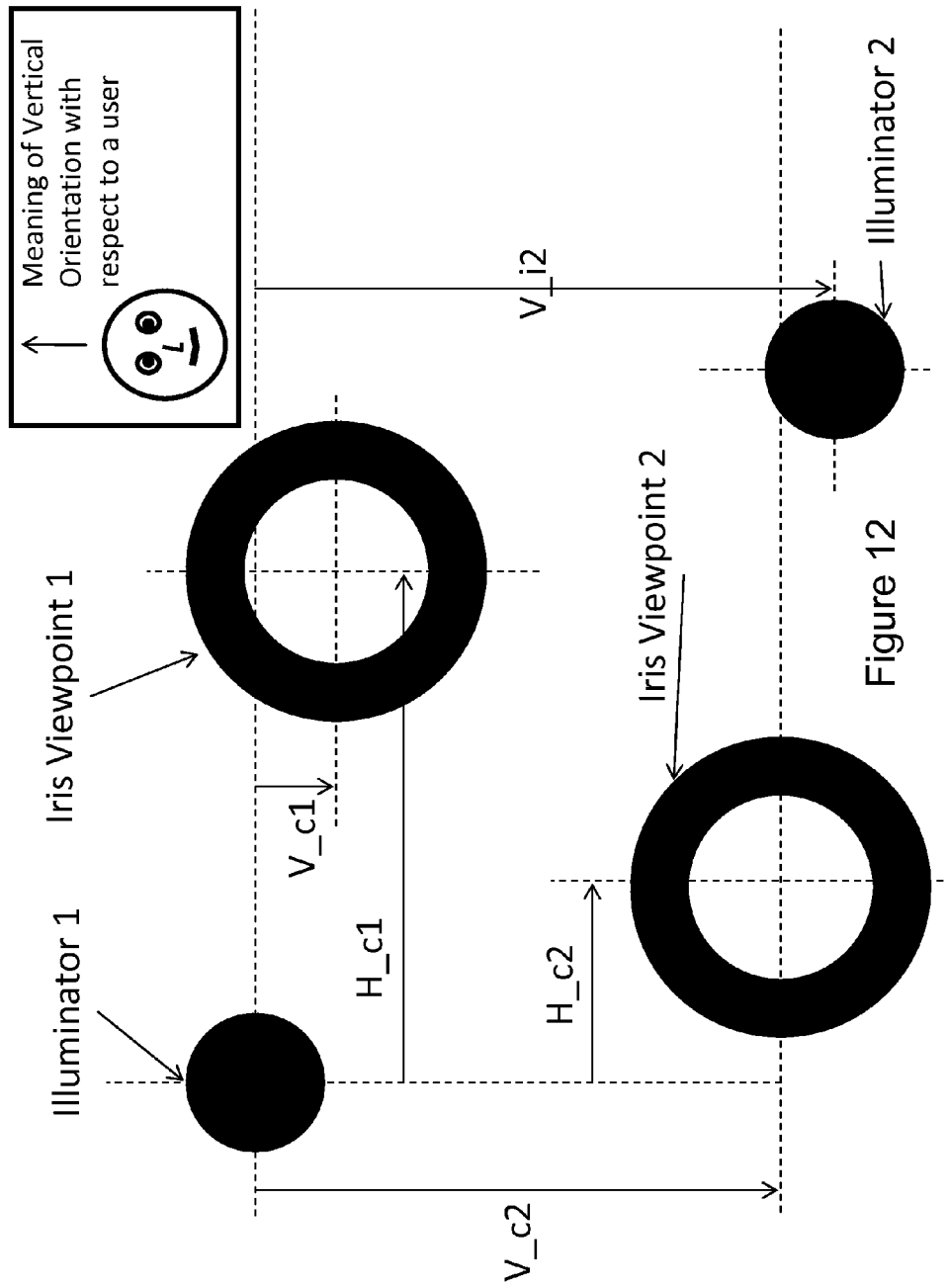
FIG. 12 depicts one embodiment of a system comprising two illuminators and two viewpoints spatially disposed with respect to the first illuminator.

FIG. 12 shows another example configuration of the system, whereby there are at least two illuminators and two viewpoints at a vertical distance $V\_c1$ and $V\_c2$ with respect to the first illuminator and at a horizontal distance $H\_c1$ and $H\_c2$ respectively with respect to the first illuminator, and where the second illuminator is at a vertical distance $V\_i2$ from the first illuminator. In this case, the distance between the viewpoints may be increased or maximized as discussed above. Moreover, two illuminators in different positions can be used, with similar benefits discussed above.

Figure 13:
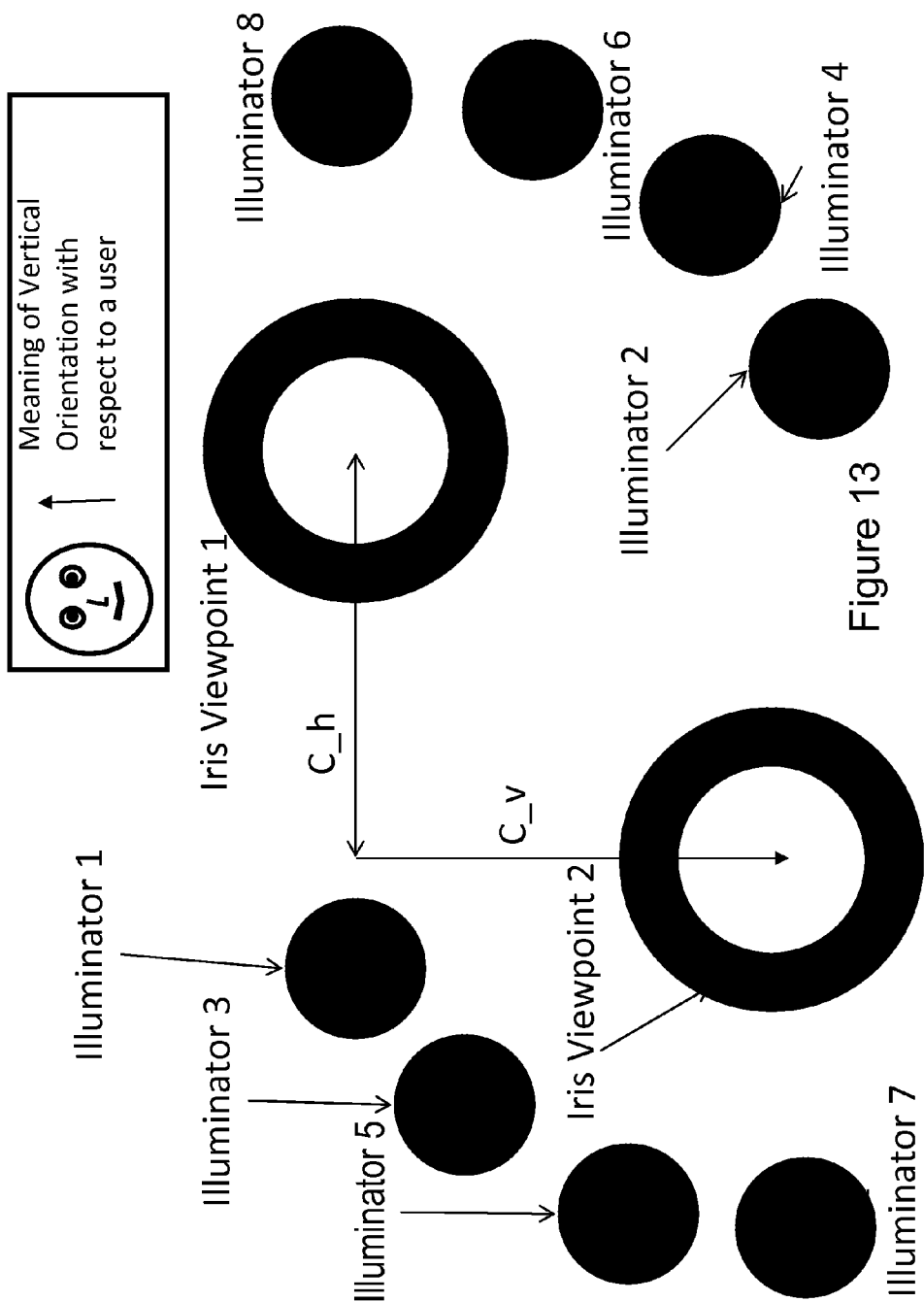
FIG. 13 depicts one embodiment of a system comprising two cameras and multiple discrete illuminators, each at a different vertical and horizontal position.

FIG. 13 shows another example configuration of the system, whereby there are two cameras positioned at different vertical and horizontal positions, and multiple discrete illuminators each at different vertical and horizontal positions. In this case, each illuminator can be turned on in isolation or in combination with other illuminators so that specular reflection can be positioned at, or moved to different locations across the eye, thereby maximizing or increasing the likelihood that one of the positions may be optimal for acquiring an unoccluded image of the region of interest (e.g., iris region).

Figure 14:
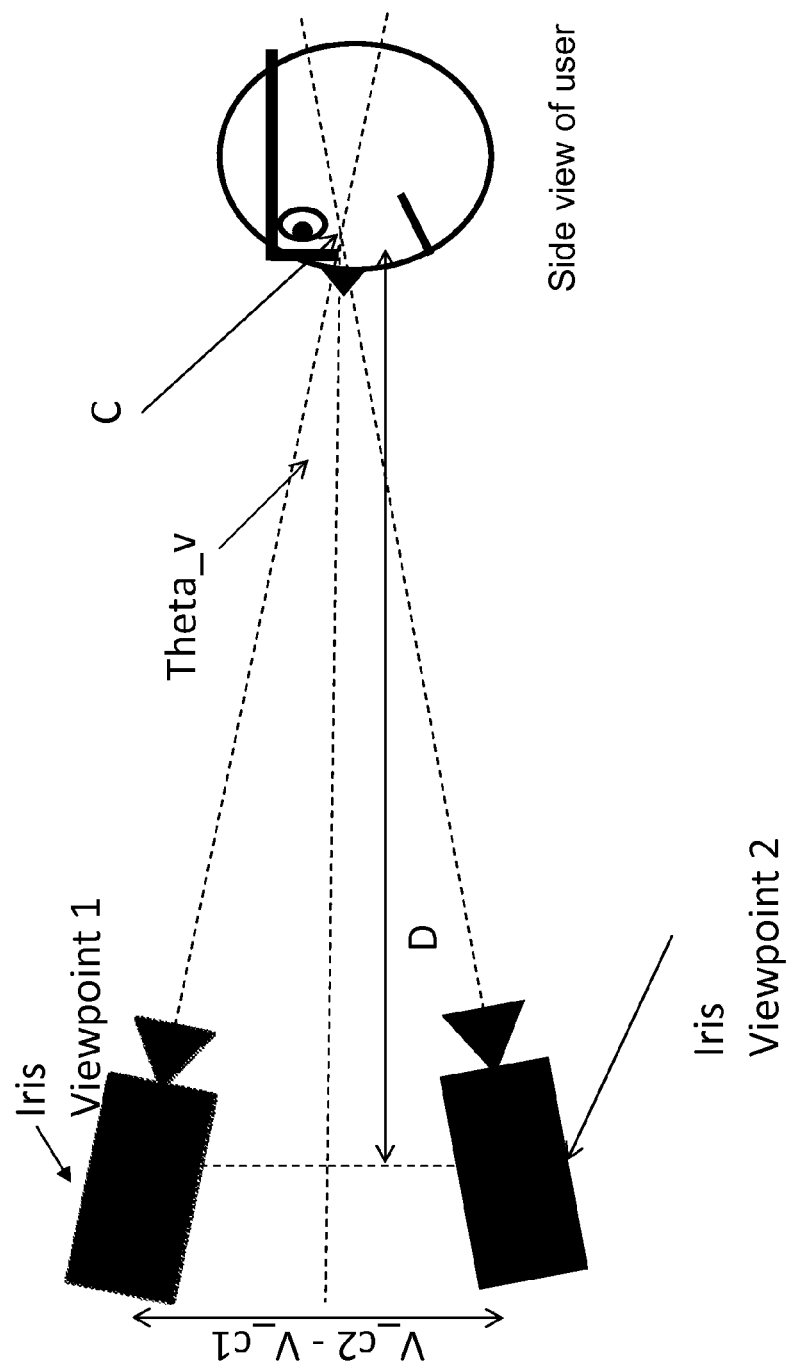
FIG. 14 depicts one embodiment of tilt orientation of cameras in a system supporting two cameras at a different vertical location.

FIG. 14 shows a example tilt orientation of viewpoints in a configuration where there are two viewpoints at different vertical locations. The viewpoints may converge vertically at the nominal operating distance D to a same height as each other with respect to the vertical orientation of the user, since the eyes of the user are also at the same vertical height. If this is not the case, the eyes of the user may not necessarily be visible from both viewpoints at the same time. The value of tilt, in some embodiments, may be described by the following geometry; the viewpoints may be tilted around a substantially horizontal axis each by an angle Theta_v, given by Theta_v=a Tan(0.5*(V_c2−V_c1)/D), where (V_c2−V_c1) is the vertical distance between the viewpoints and D is the nominal distance from the viewpoints to the user. As an option, one camera may be tilted more or less than the other, as long as the viewpoints converge vertically at the nominal operating distance as discussed previously. For example, with an operating range of 30 cm and a vertical camera separation of 6 cm, the angle Theta_H may be determined to be 5.7 degrees.

Figure 15:
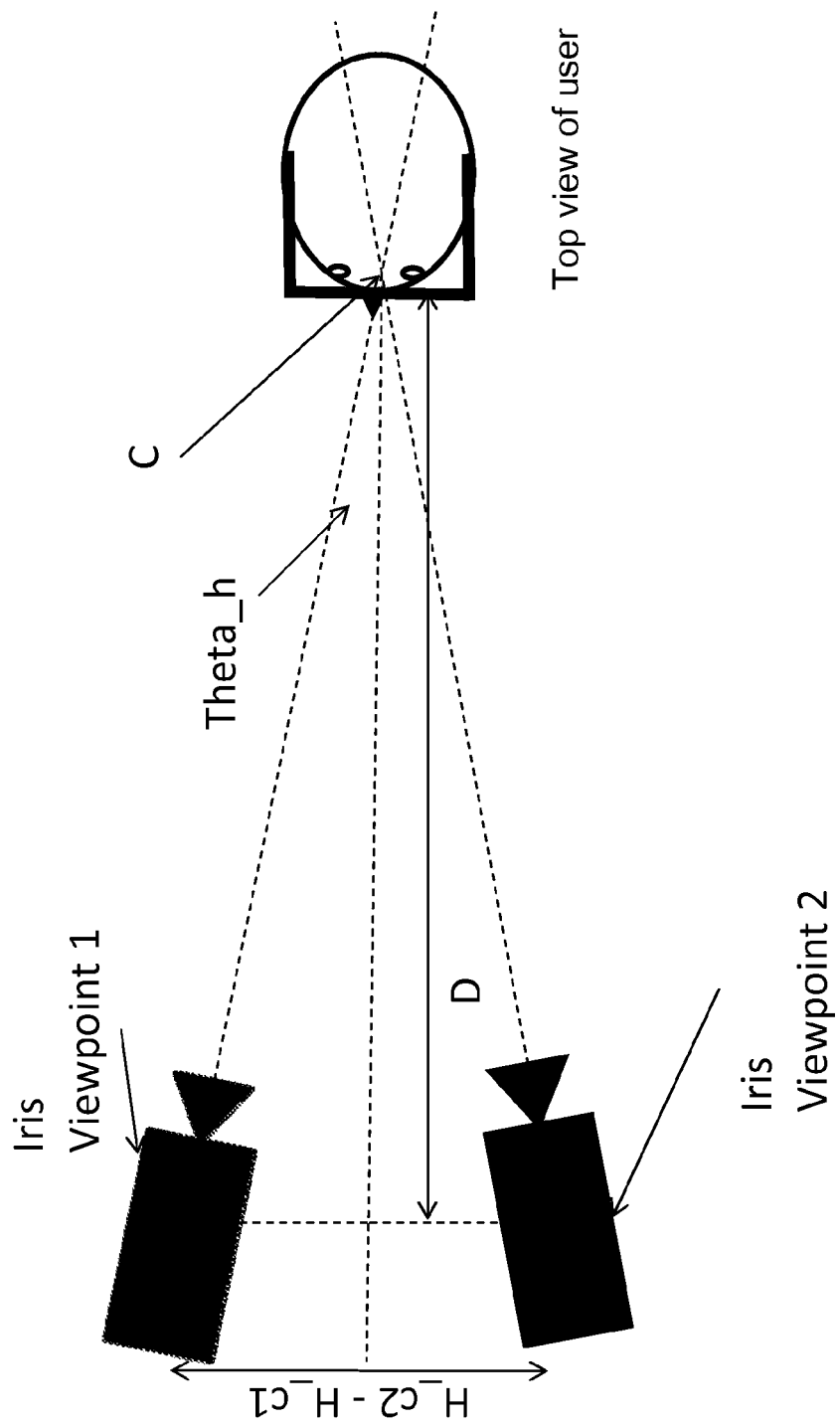
FIG. 15 depicts one embodiment of tilt orientation of viewpoints in a system supporting two viewpoints at different horizontal locations.

Similarly, FIG. 15 shows an example tilt orientation of the viewpoints in a configuration where there are two viewpoints at different horizontal locations. The value of tilt may be given by the following geometry; the viewpoints may be tilted around a substantially vertical axis each by an angle Theta_h, given by Theta_h=a Tan(0.5*(H_c2−H_c1)/D), where (H_c2−H_c1) is the horizontal distance between the viewpoints and D is the nominal distance from the viewpoints to the user. As an option, one camera may be tilted more or less than the other, as long as the viewpoints converge horizontally at the nominal operating distance as discussed previously. Note that different vertical and horizontal viewpoints can be combined, as shown in FIGS. 11, 12 and 13.

Figure 16:
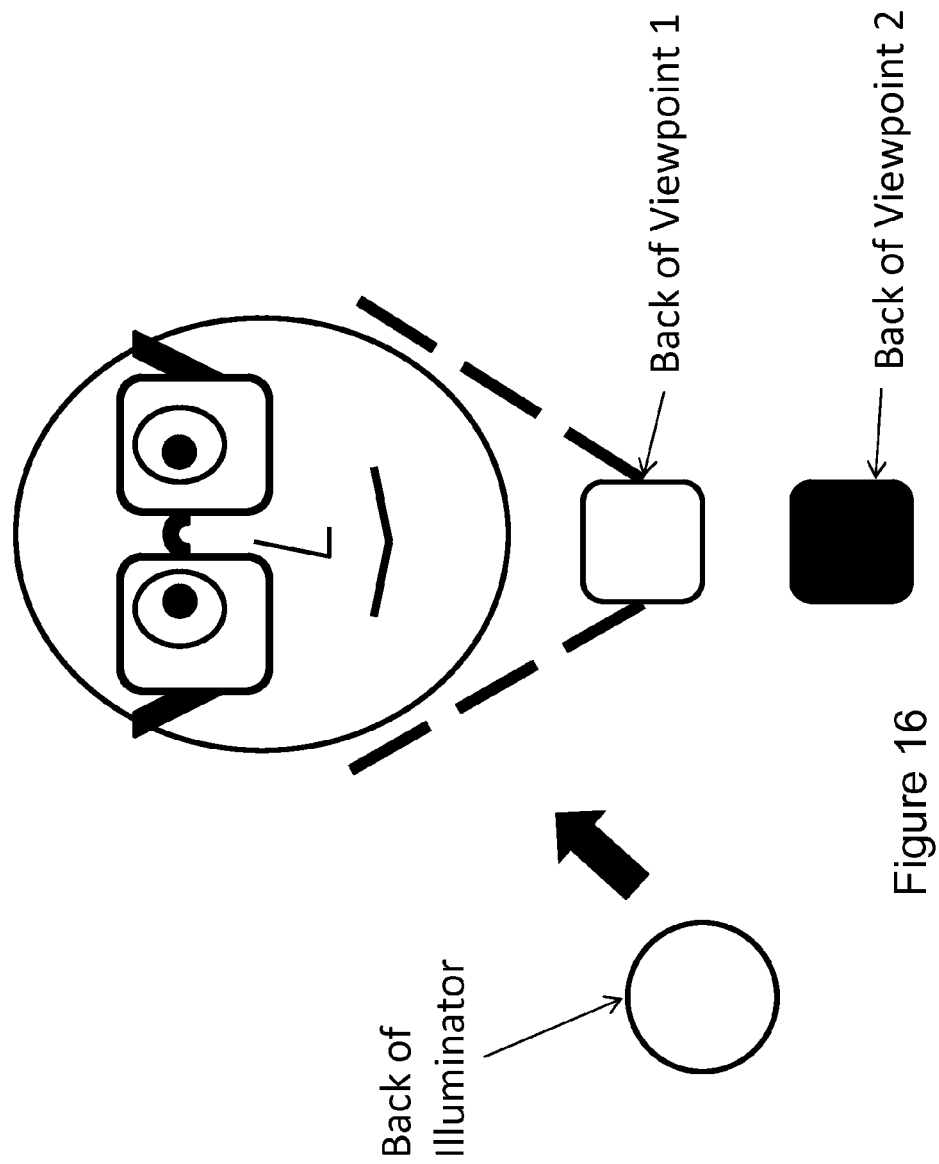
FIG. 16 depicts one embodiment of a system setup in which imagery is acquired from a higher camera position.
Figure 17:
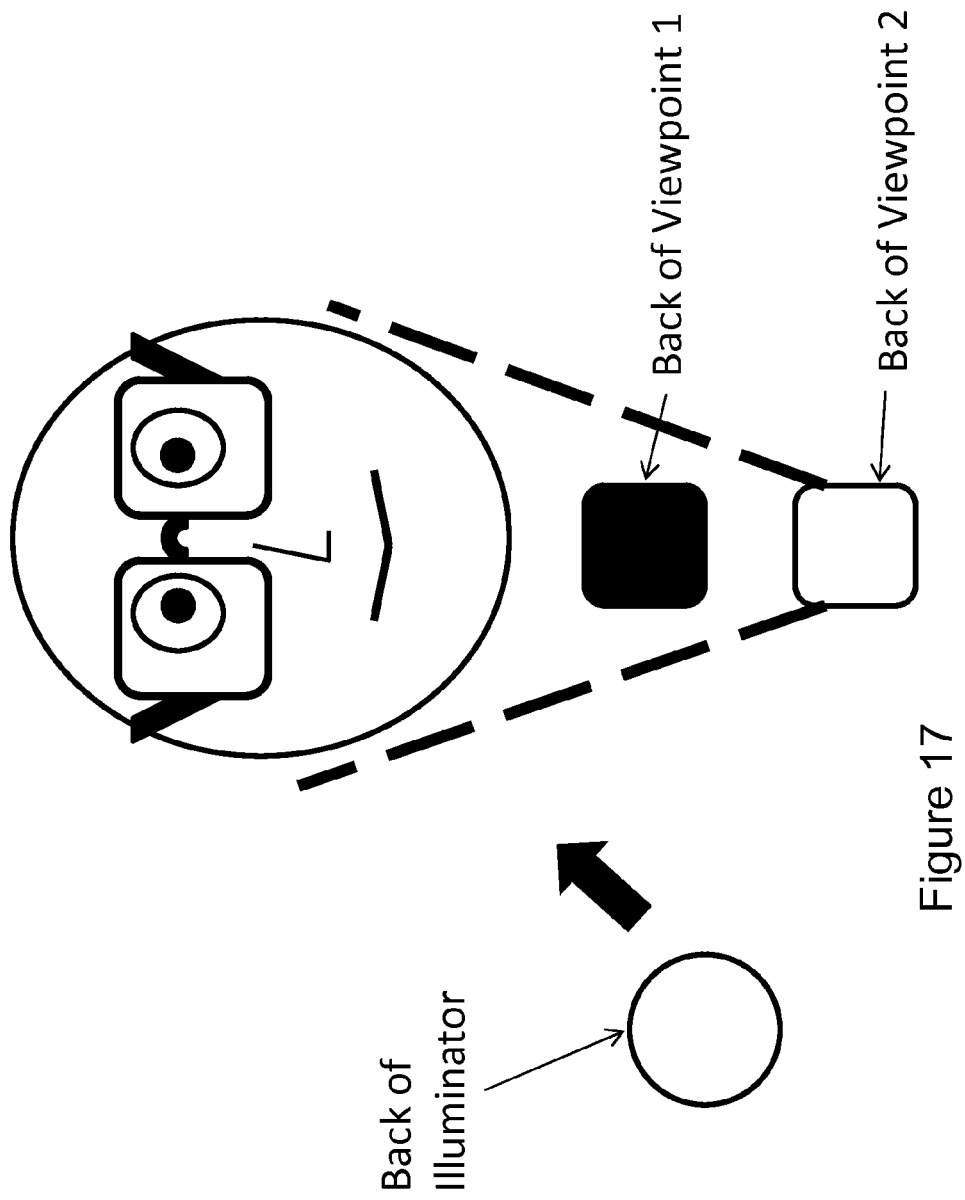
FIG. 17 depicts one embodiment of a system setup in which imagery is acquired from a lower camera position.
Figure 18:
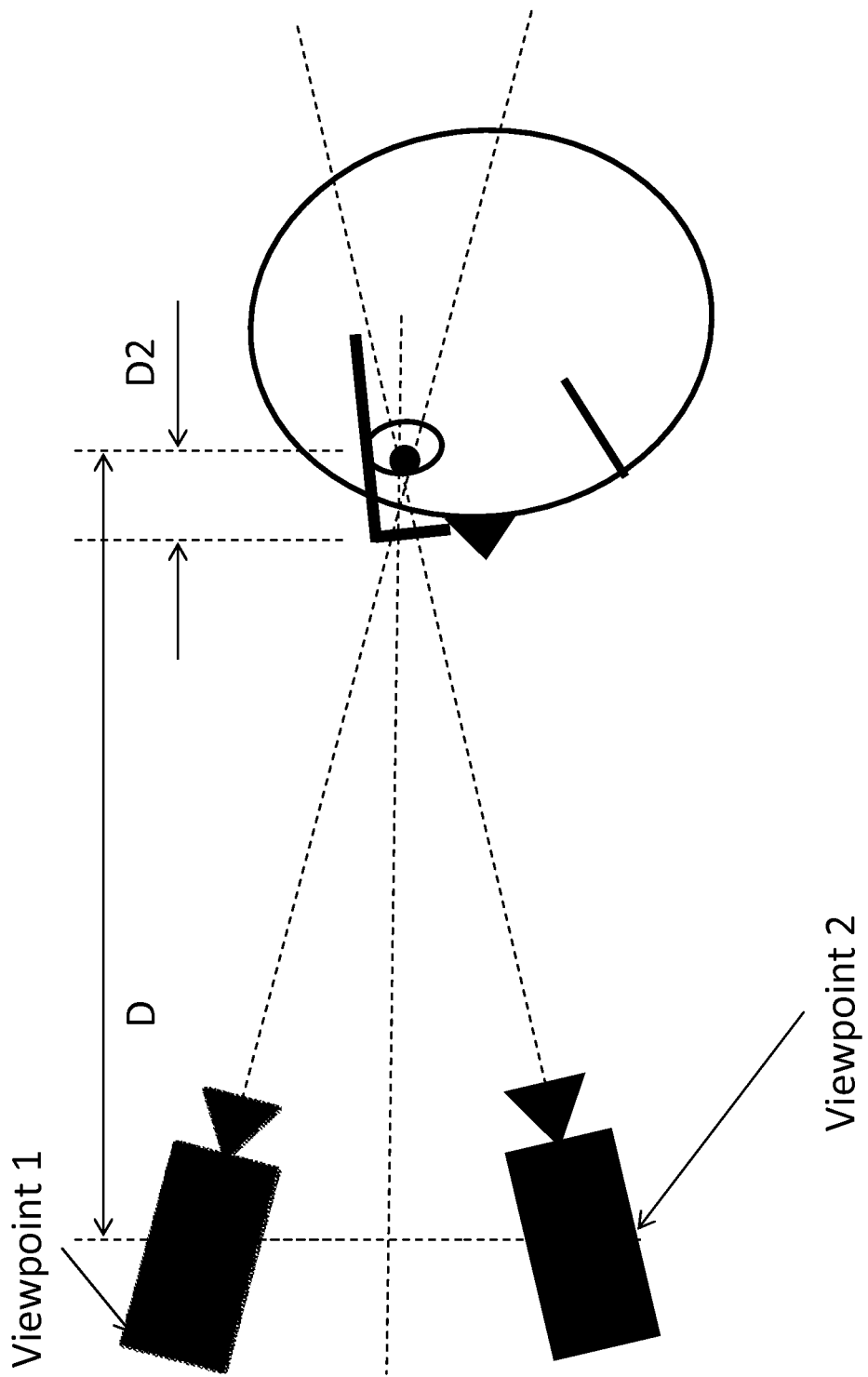
FIG. 18 depicts one embodiment of a profile view of an image acquisition setup.

One advantage of the system disclosed relates to being able to reduce or eliminate the negative effects on performance arising from artifacts other than those from specular reflections. Such artifacts may include dirt on the surface of the lenses of glasses, or may include the occlusion of parts of the iris by the frames of glasses themselves. FIG. 16 shows the conditions under which imagery is acquired from a first camera position, while FIG. 17 shows the conditions under which imagery is acquired from a second, lower camera position. FIG. 18 shows a profile view of the corresponding image acquisition conditions. The user is wearing glasses, and the distance from the iris to the glass frames is D2. The distance from the iris to each camera is D. The distance D2 may be significant since the fact that this distance is non-zero may mean that imagery of the eye region captured from different viewpoints can result in parallax, or relative displacement, of corresponding features in the images, which in this case are the frames of the glasses and the iris itself. The amount of relative displacement may depend on imaging parameters, such as the distance D from the cameras to the iris, as well as D2. FIG. 19, on the left side of the figure, shows as an example imagery captured from the top viewpoint. FIG. 19, on the right side of the figure, shows as an example imagery acquired from the bottom viewpoint. Note that the iris is partially occluded by the spectacle frames in the imagery acquired from the top viewpoint, but is not occluded in the imagery acquired from the bottom viewpoint. This is due to the parallax between the two images created by the two different camera positions, and the different relative ranges or distance of the iris from the cameras and the glass frames. The same parallax may be observed by any object located at a different range to the camera compared to the iris, such as dirt on the surfaces of the glasses, or a line due to a boundary between the near and far optical surfaces lenses in bifocal glass lenses. Methods for processing these types of images will be described later.

It is to be noted that the location of such artifacts (glass frames, dirt on lenses, bifocal boundaries) are unchanged in imagery acquired from one sensor position if there is no relative motion in range between the sensor and the user, even if the scene is illuminated by multiple illuminators from different directions. This is in contrast to artifacts due to specular reflections off lenses that do in fact change locations when illuminated by multiple illuminators from different locations since the artifacts are due to the illuminators themselves and not other objects.

Figure 20:
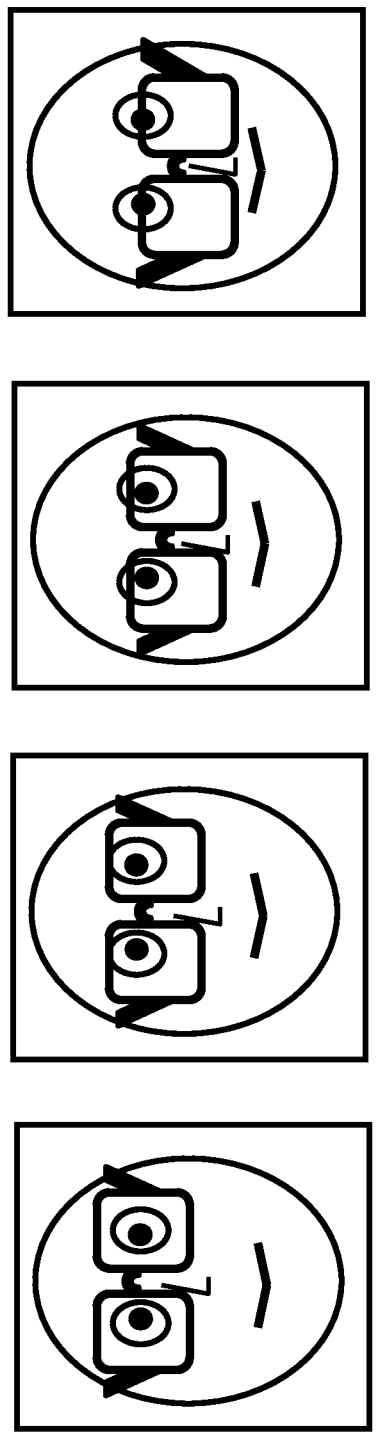
FIG. 20 depicts one embodiment of images acquired using a system with vertical displacement of cameras.

Parallax can be created by either or both horizontal and vertical displacement of the cameras, or by motion of the user as also discussed in the disclosure. We have noted an advantage with vertical displacement of cameras, as shown in FIG. 20. Typically we have noted that users easily align themselves naturally in front of a system in the horizontal (lateral) direction, since there is essentially only 1 degree of freedom, which is the horizontal location of their feet. However, we have noted that the users' vertical alignment with respect to a biometric acquisition system may be a function of several variables, including the tilt of the head of the user, and the vertical position of glasses on the nose of the user, both of which may be very difficult to describe to a user to adjust. The horizontal position of glasses on the other hand may be constrained to be essentially fixed by the geometry of the nose and the bridge of the glasses. As a result we have measured less occlusion from the left and right edges of glass frames, compared to the top and bottom edges of glass frames. In addition, bifocal lenses may typically create a horizontal linear artifact across the iris. Displacing the cameras horizontally may only serve to move both the bifocal lens artifact and the substantially horizontal top and bottom edges of the glass frames in the horizontal direction in the two images, and may still leave the area of iris underneath occluded in both images. Displacing the cameras vertically however, may serve to move the bifocal lens artifact and the top and bottom edges of the glass frames in the vertical direction in the two images, thereby allowing the area of iris to be unoccluded in at least one of the images.

Figure 21:
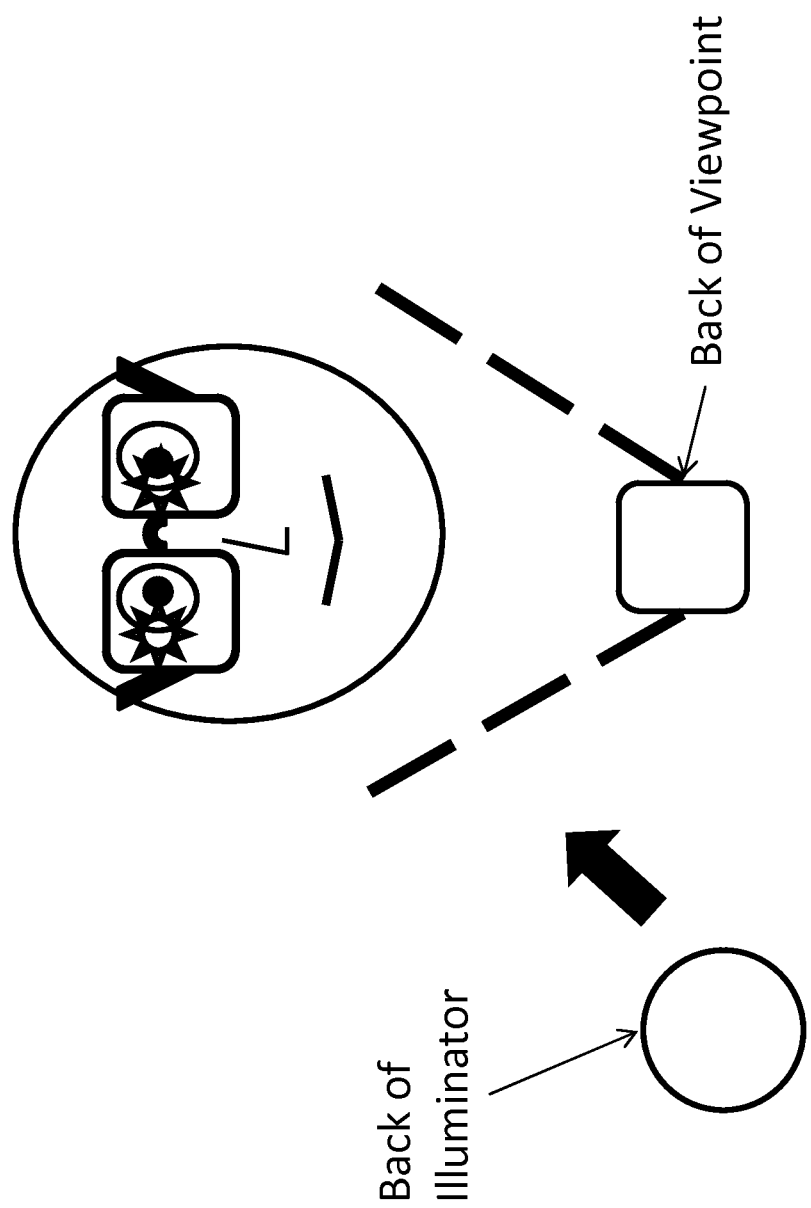
FIG. 21 depicts one embodiment of imaging conditions when a user is located further away from a biometric acquisition device.
Figure 22:
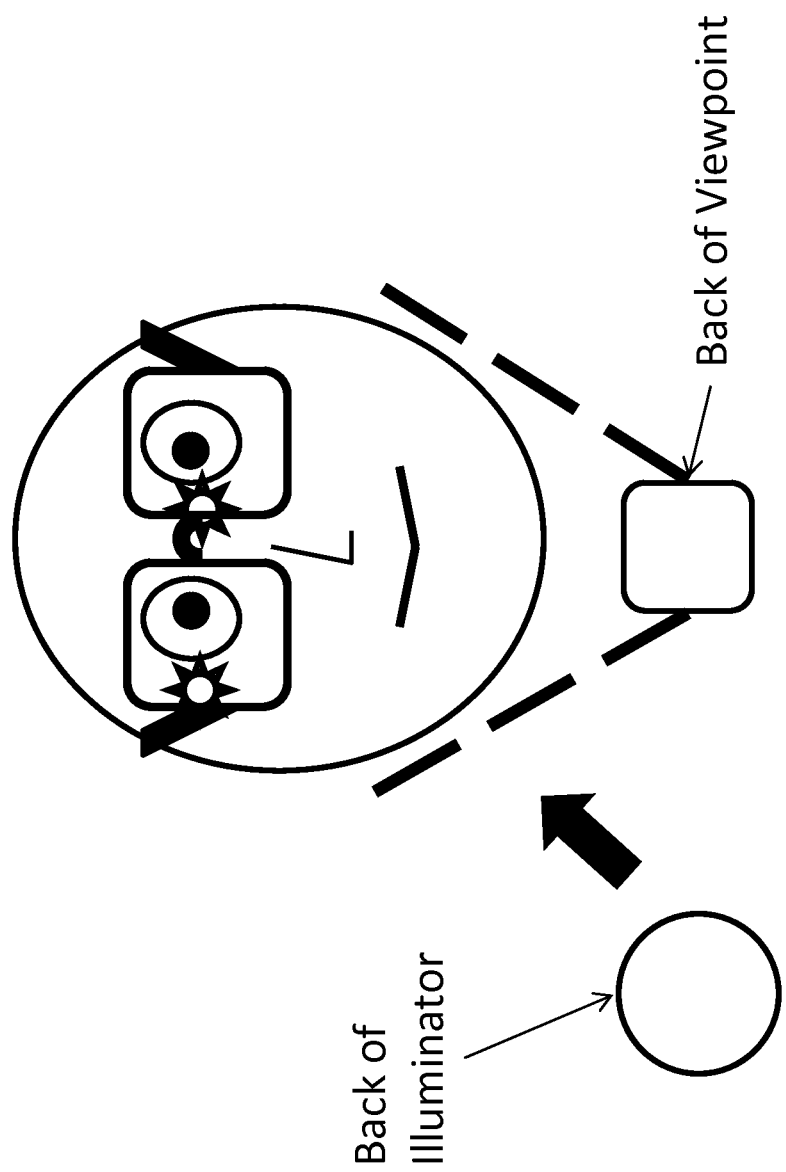
FIG. 22 depicts one embodiment of imaging conditions when a user is located closer to a biometric acquisition device.
Figure 23:
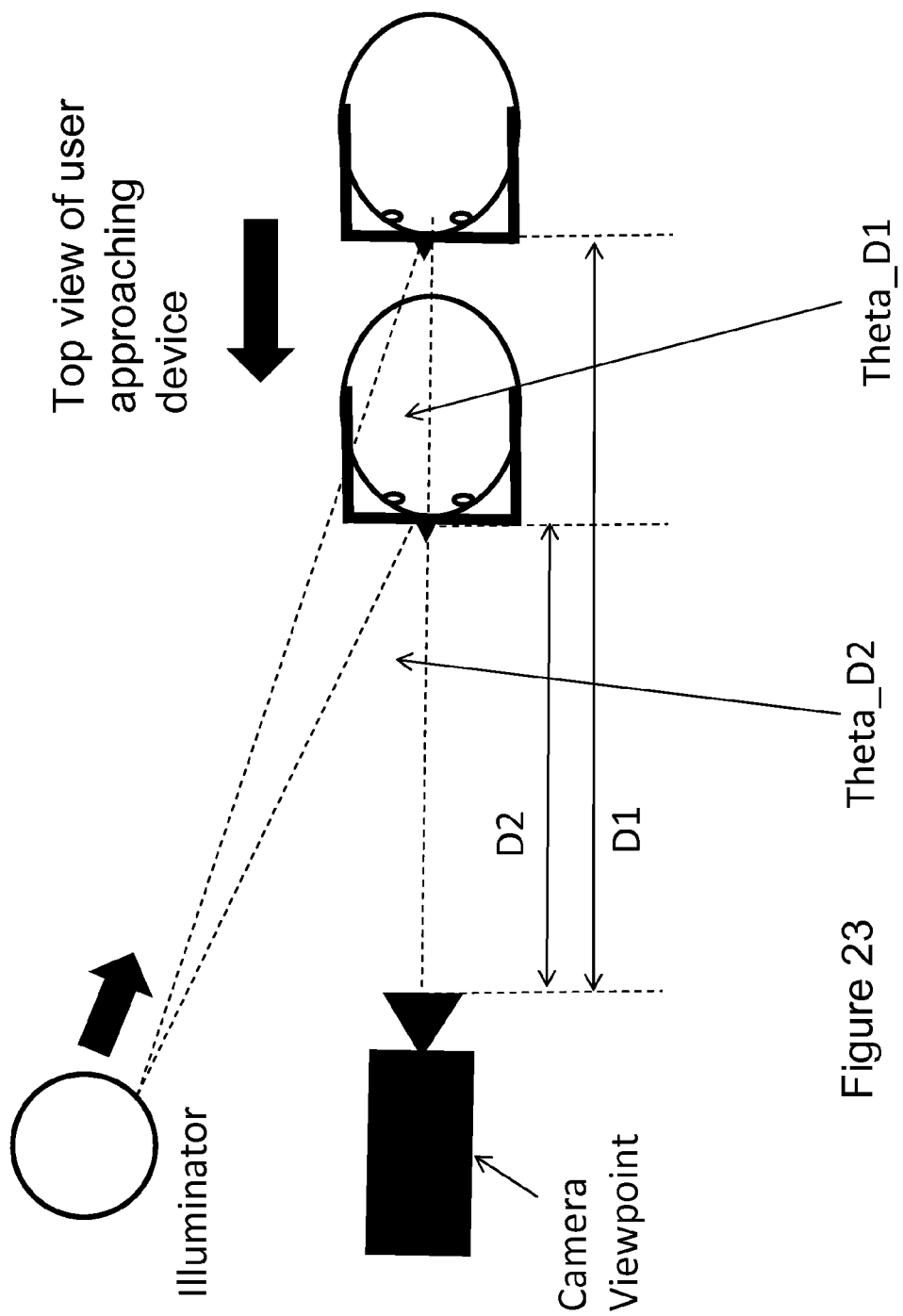
FIG. 23 depicts an embodiment of a system with a camera and an illuminator, and a plan view of a user moving towards the camera.

In another aspect, a single camera and a single illuminator may be used. In this aspect, images may be acquired as the user rotates the user's head and/or approaches the biometric acquisition device, as shown in FIGS. 21 and 22. FIG. 21 shows, for example, imaging conditions with the user further away from the device, while FIG. 22 shows, for example, the user closer to the device, in which specular reflection and/or artifacts may be repositioned relation to the iris area of interest with the user's motion. FIG. 23 shows, for example, a plan view of the user moving towards the device. In this case, the angle Theta_D1 between the camera, illuminator and glass frames, may change to Theta_D2 due to user motion so that in the acquired image sequence, specular reflections that may have appeared in a first position may move to a second position. The depth of field of the camera may be small so that images acquired at different ranges may become out of focus. This can be resolved however by adjusting the focus of the camera dynamically.

Figure 24:
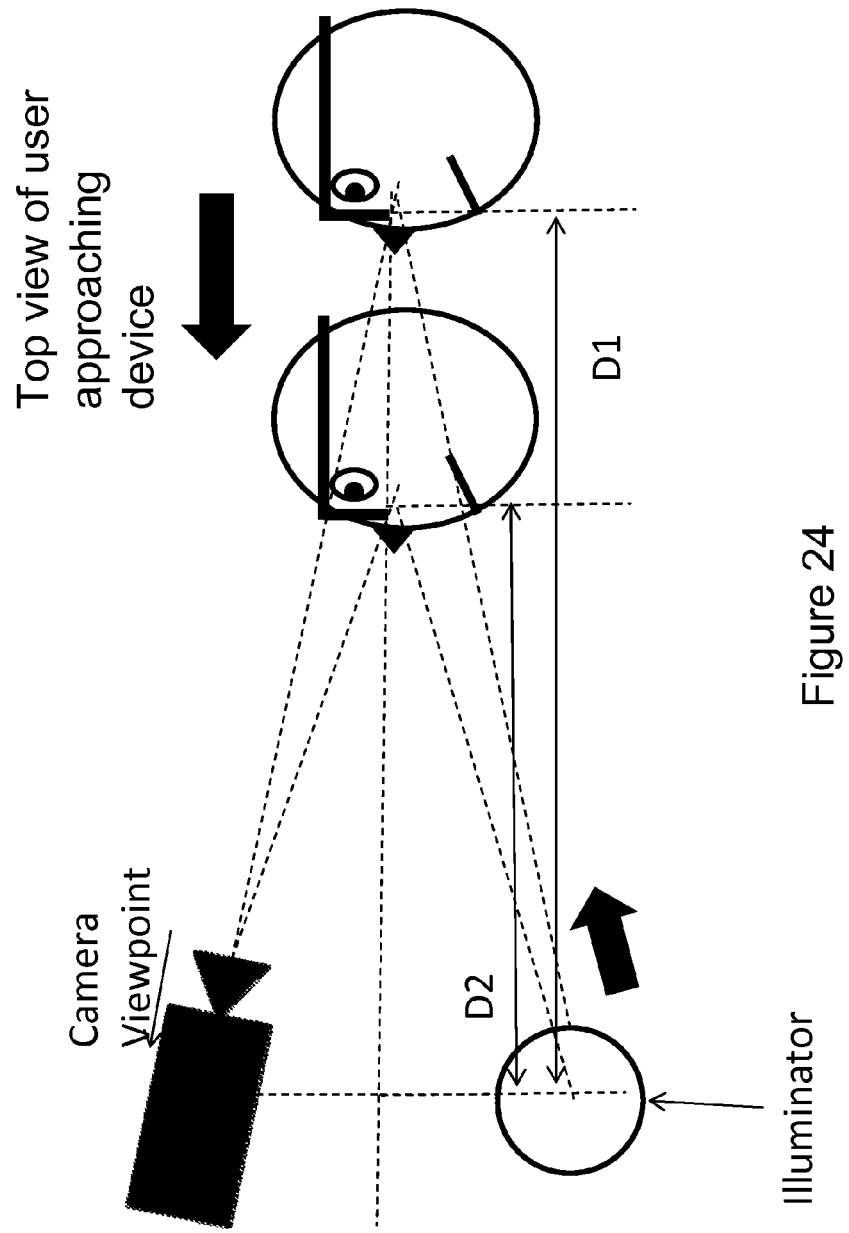
FIG. 24 depicts an embodiment of a system with a camera and an illuminator, and a side view of an approaching user.

FIG. 24 shows a similar configuration, with a single camera and illuminator, with an illustrative side view of an approaching user. In this case, the movement of the user may create parallax displacement between the spectacle frames and the iris in the acquired sequence of images, similar to that discussed in connection with FIG. 23.

Figure 25:
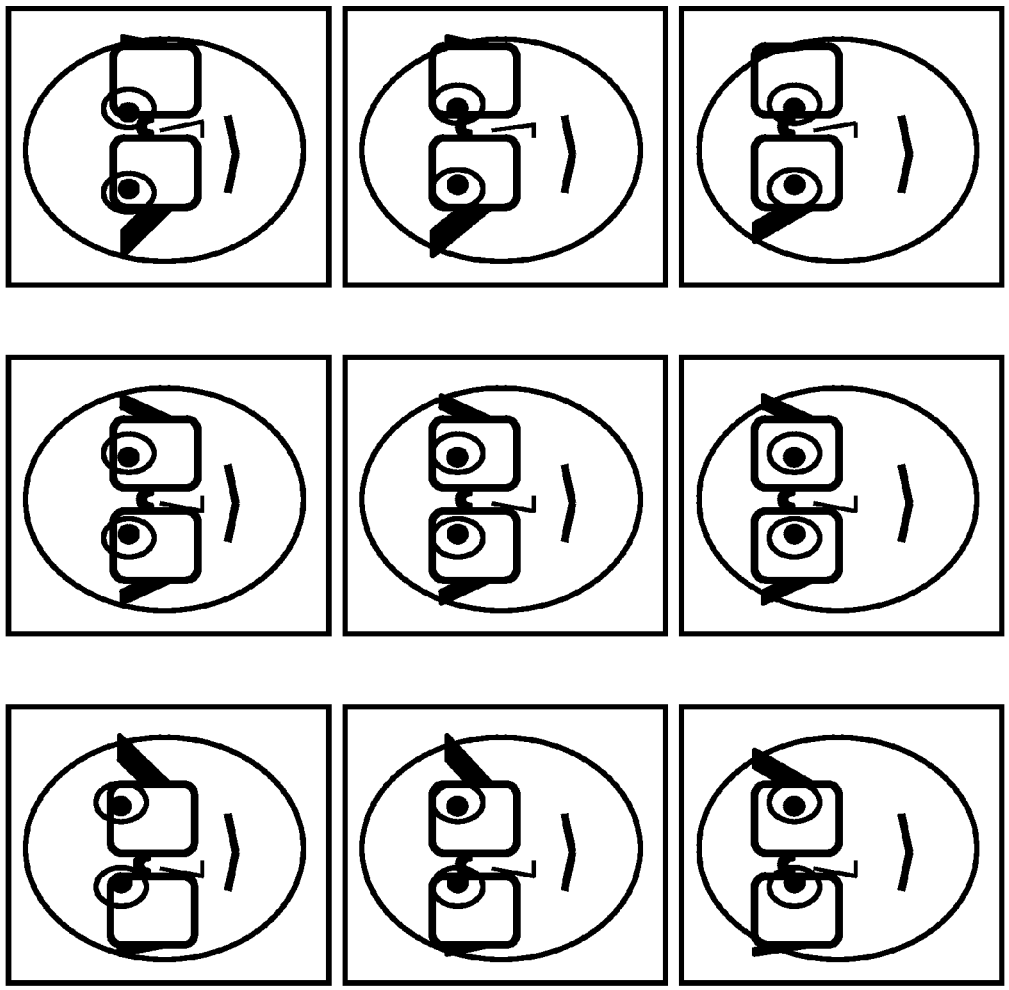
FIG. 25 depicts a configuration in which images can be captured from multiple horizontal and vertical viewpoints or multiple user positions or gaze directions.

In other systems where the user is not necessarily looking at the system, for example, images can be captured from a plurality of horizontal and vertical viewpoints, or a plurality of user positions or gaze directions, as shown, for example, in FIG. 25.

Figure 26:
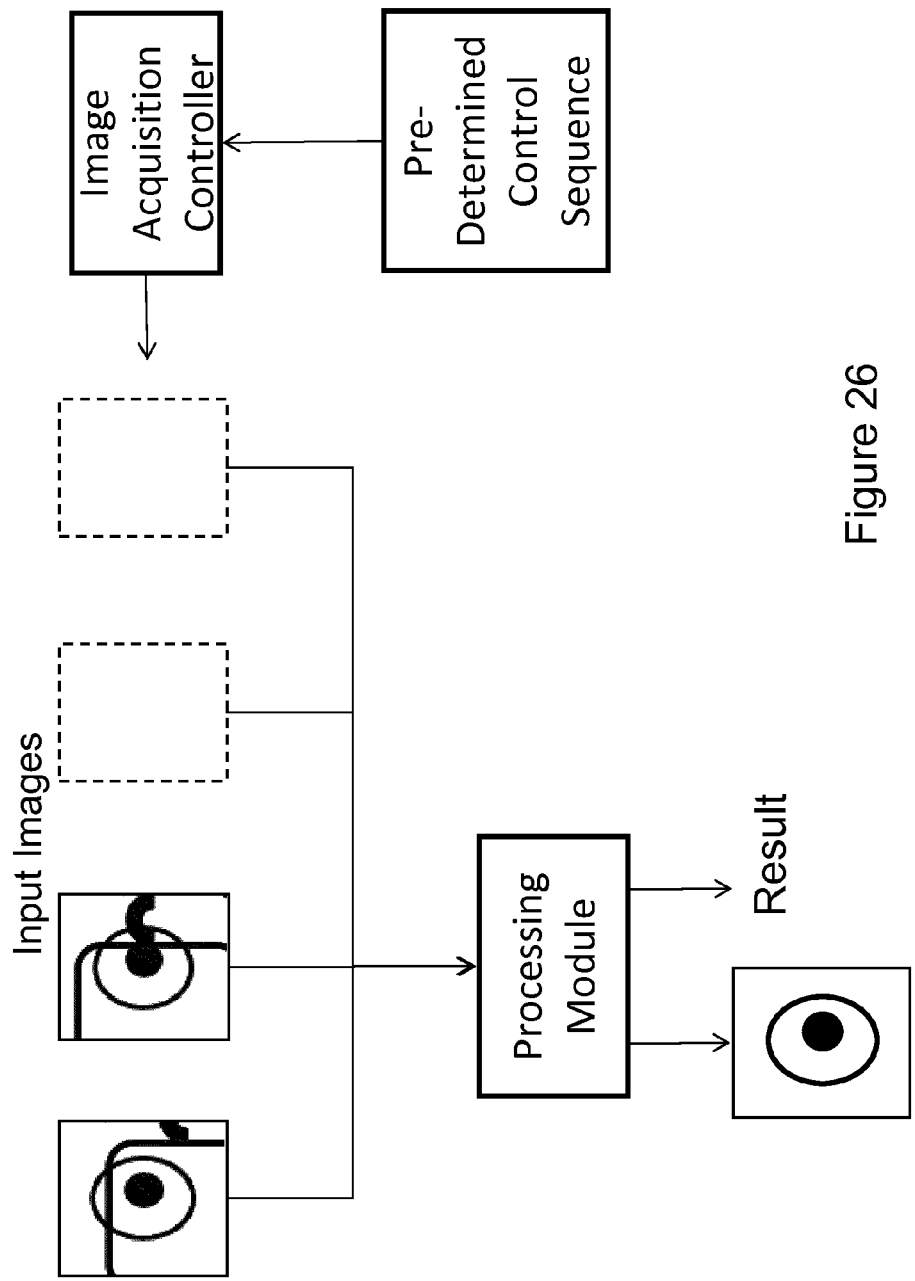
FIGS. 26 and 27 depict embodiments of processing that may be performed on multiple images acquired from different camera positions, illumination conditions, user positions and/or gaze positions.
Figure 27:
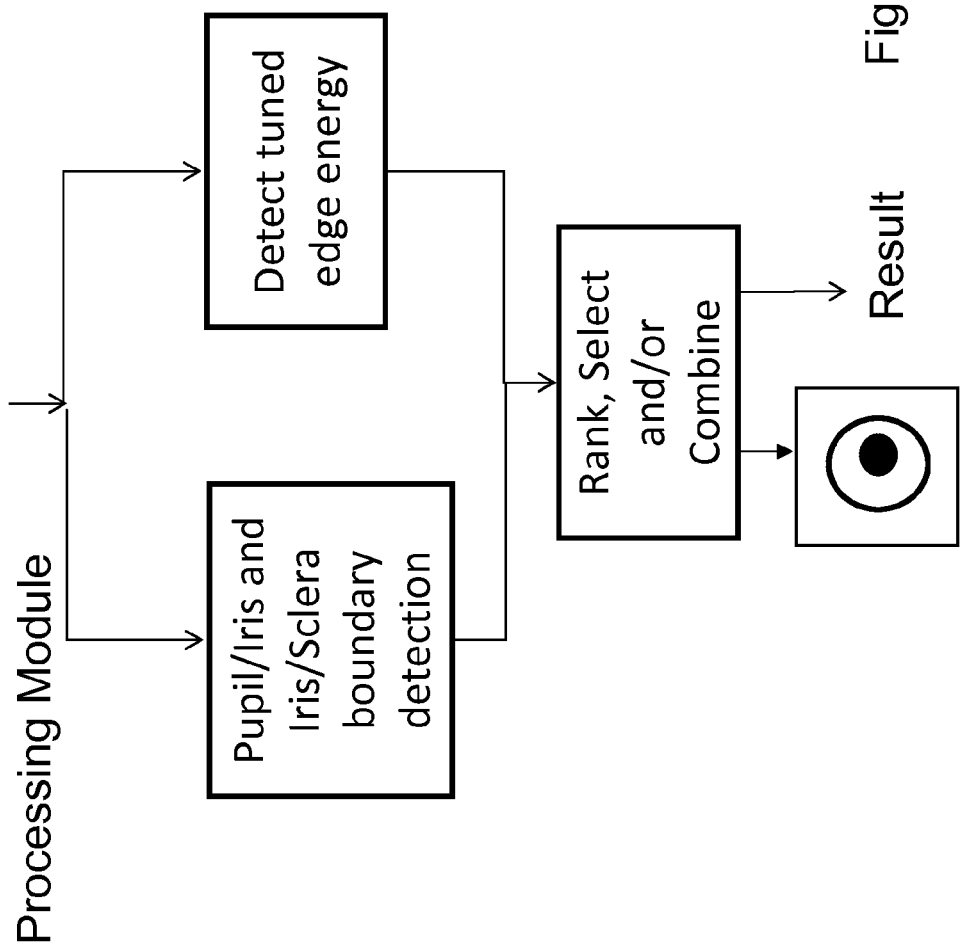

FIGS. 26 and 27, depicts embodiments of processing that may be performed on multiple images acquired. These images may be acquired from different camera positions, illumination conditions, user positions or gaze positions, as described in this disclosure. One point to note is that there is no feedback from the processing module to the image acquisition controller module, in order to adjust which illuminator is turned off or on, for example. However, in a modified approach, in order to avoid or remove specularities or other artifacts from glasses, a biometric system may acquire an image from a camera with one illuminator on, analyze the imagery for the presence of an artifact, and if necessary acquire another image with the second illuminator turned on (and the first illuminator turned off). In certain contexts, however, there may be relative motion between the device and the user. For example, the user may be in motion and the device may be stationary. Therefore, by the time an analysis is performed, the region of interest of the user (e.g., iris region) may have moved out of the capture volume of the system. As such, the biometric acquisition system may be configured such that as many images as possible, or as required, are acquired as rapidly as possible in an open-loop fashion (e.g., without feedback on artifact detection), using a pre-determined control sequence. In the case of configurations that include multiple cameras, unlike in the case of configurations with multiple illuminators and a single camera, there is an advantage that multiple images can be captured simultaneously by different cameras, thereby reducing acquisition time. Although more images may be acquired, which can take up more memory and may increase overall processing time, the images are however acquired in closer succession or even simultaneously in time and therefore it may be more likely that the user will still be in a corresponding capture volume of a biometric acquisition device during the period of image acquisition.

In one aspect, an embodiment of the processing steps are shown in FIG. 26, with a more detailed view of an example processing module being shown in FIG. 27. Processing may be performed by detecting artifacts arising from the use or presence of glass frames or bifocal lens. These artifacts may create substantially linear features, with high contrast and with lengths that may be comparable to the size or dimensions of the iris. This is in contrast to the smaller, low-contrast, randomly-oriented line segments that are often found in the iris structure itself. The systems described herein may be configured to enhance and/or characterize lines or features of particular sizes and contrasts. Filters may be selected so they are tuned for the length and contrast expected from the artifacts. Each image may be processed with these filters and, with particular detection methods, an intermediate output image may be created that gives the maximum energy for the tuned model of the edge at any orientation at each particular pixel in the image. If the edge energy is above a threshold, for example, the system may determine that an artifact is present at that location in the image.

An eye-finding process may be performed by detecting the pupil/iris and iris/sclera boundaries using, for example, a Hough transform. This recovered information may be used in one of at least two ways. In the first method, a ranking process may be performed which intersects an area detected to be occluded by artifacts with an area detected to be the iris, to compute a percentage iris occlusion metric for each acquired image, and places them in order on a list. Images at the top of the list may be selected for subsequent processing since they may have been detected to be the least corrupted by artifacts.

In a second method, the locations of the pupil/iris and iris/sclera boundaries may be used to register the acquired images and the edge-energy images together. These aligned images may be further processed such that the registered edge energy at each image location is analyzed for each acquired image, and image locations where the edge energies are above a threshold, or are larger than the other edge energies corresponding to the image location, may be rejected from further processing. The remaining image locations may be processed by, for example, selecting the iris pixels at a location corresponding to the least edge energy from artifacts at that location. In a related aspect, image pixels corresponding to specular reflections can also be used in the processing step described above. Specular reflections can be detected, and an image created to be free or substantially free of specular reflections. In some implementations, images acquired at different times may result in a decreased likelihood that the region of interest of the user will still be in the capture volume, as discussed earlier. In other implementations, a biometric setup may require more than one illuminator, which can increase the size and cost of the system.

Figure 28:
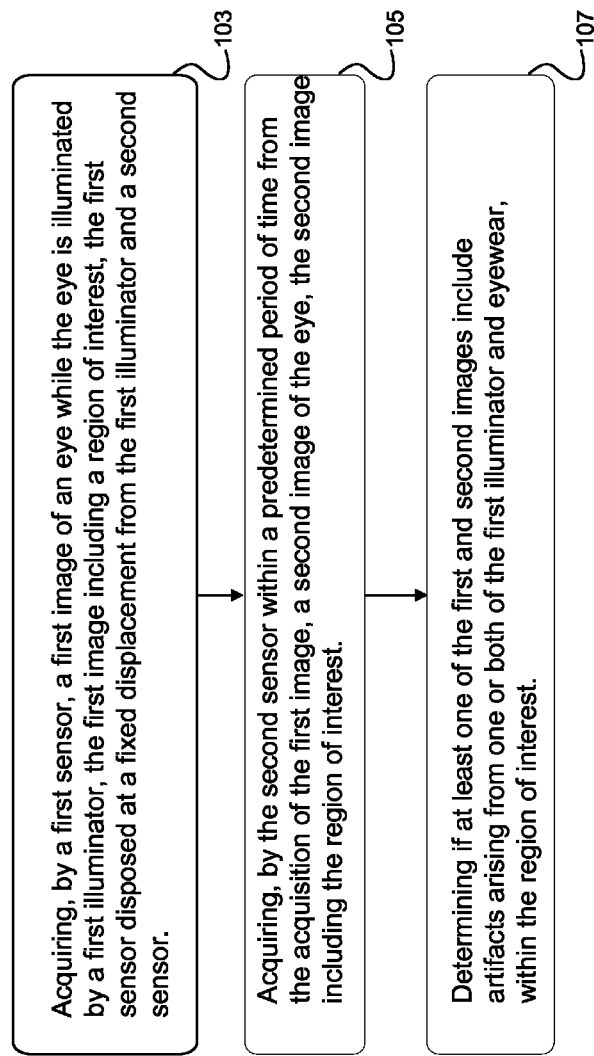
FIG. 28 depicts one embodiment of steps of a method for capturing artifact free images.

Referring now to FIG. 28, one embodiment of a method of acquiring artifact-free biometric images of an eye is depicted. The eye may be in relative motion with a first sensor (or a biometric acquisition device), and in the presence of partially-reflective eyewear. A first sensor may acquire a first image of an eye while the eye is illuminated by a first illuminator (103). The first image may include a region of interest. The first sensor may be disposed at a fixed displacement from the first illuminator and a second sensor. The second sensor may acquire, within a predetermined period of time from the acquisition of the first image, a second image of the eye (105). The second image may include the region of interest. An image processor may determine if at least one of the first and second images include artifacts arising from one or both of the first illuminator and eyewear, within the region of interest (107).

In some embodiments, a biometric acquisition system comprises a biometric acquisition device, which may include a mobile, portable and/or handheld device. The device may be used for illuminating and/or capturing one or more biometric images of a subject. The device may include one or more sensors or cameras for acquiring biometric data, such as infra-red sensors. The biometric data targeted by the device may include iris or other information that may be captured on an image, such a retinal information. The biometric data may be acquired from a region of interest designated on a subject's eye, e.g., an iris region of the eye. The biometric acquisition device may be configured to detect and/or locate the subject's eye and/or the region of interest.

Although references to acquisition of biometric data is sometimes referenced with respect to an eye, it is understood that this is merely for illustration purposes and not intended to be limiting in any way. Each sensor may acquire biometric data from a pair of eyes, including their respective regions of interest, in a single image for example. As such, two data sets (e.g., one from each eye) may be captured in each image and used for biometric verification or matching purposes, thereby increasing the likelihood of yielding at least one suitable data set with each image capture. Moreover, simultaneous capture of two data sets may be more efficient as compared to separate or sequential image acquisition. Simultaneous capture of two data sets is also useful when the subject is in motion, where there is increased risk that a subject may exit a capture volume during acquisition if these data sets are acquired sequentially. As such, any reference to acquisition of a first, second, third or fourth image of an eye may refer to acquisition of a first, second, third or fourth image of a pair of eyes.

In certain embodiments, the biometric acquisition device may include one or more illuminators or light sources, which may be used to illuminate an eye region of the subject for biometric acquisition. The illuminator may be used for illumination of one or more features of the subject during detection and/or location of the subject's eye or region of interest. The illuminator may illuminate an eye during biometric acquisition. The illuminator may be synchronized with a sensor to turn on and/or increase illumination levels during image acquisition. The illuminator may provide infrared and/or visible light, and may comprise a LED-based light source. The size and/or form factor of the biometric acquisition device may be determined by an arrangement of one or more sensors and/or illuminators.

Referring now to (103), in more detail, a first sensor may acquire a first image of an eye while the eye is illuminated by a first illuminator. The first image may include a region of interest, which may be an iris region of the eye. The first sensor may be disposed at a fixed displacement from the first illuminator and a second sensor, for example, as discussed above in connection with FIGS. 4-8 and 10-16, and any combination thereof. The first sensor's location on the biometric acquisition device may be fixed relative to that of a first illuminator and/or second sensor. In some implementations, the first sensor's location on the biometric acquisition device may be adjustable or automatically adjusted based on an image acquisition scenario, relative to that of the first illuminator and/or second sensor. The first and second sensors may each comprise or refer to a different viewpoint. In some embodiments, the two viewpoints are supported by a single sensor or camera, e.g., by the use of prisms or other reflective channels, or the use of a re-locatable sensor.

In some embodiments, the first illuminator may include one or more light sources. For example, a plurality of light sources may be configured to operate as a group, for example, turning on or off as a group. An example is described above in connection with FIG. 13. The first illuminator may be configured to provide a level of illumination sufficient to illuminate one or two eyes of a subject for biometric acquisition. The first illuminator may flash or strobe in conjunction with, or in synchronization with image acquisition.

In certain embodiments, the biometric acquisition device may arrange the first and the second sensors such that the optical axes of the first and the second sensors converge at substantially a nominal distance, D, between the eye and the sensors, for example as discussed above in connection with FIGS. 14-15. The nominal distance may correspond substantially to a focal length of one or both sensors, so that features of the eye is substantially in focus at a nominal distance from one or both sensors. The optical axes may converge at approximately the same spot so that the first and second sensor may substantially capture a same region of a subject's features when located at the nominal distance from the first and second sensors. In certain embodiments, the first and second sensors may acquire a region of interest simultaneously if located near the convergence point. The biometric acquisition device may tilt the first and the second sensor at an angle, Theta, from a line connecting the eye and a midpoint between the first and second sensors, according to Theta=a Tan(0.5*S/D), wherein S is a separation distance between the first and the second sensors, and D is a distance from the eye to the midpoint between the first and second sensors. The tilt angle may vary between the two sensors, depending on each sensors' distance from the eye. For example, the tilt angle for the first sensor (e.g., if larger than Theta), may be larger than the tilt angle of the second sensor (e.g., smaller than theta).

In some embodiments, the first sensor acquires the first image of the eye while illuminated by the first illuminator. The first sensor may be vertically displaced with respect to the second sensor. The first sensor may be horizontally displaced with respect to the second sensor. The first sensor may be both vertically and horizontally displaced with respect to the second sensor, for example as discussed above in connection with FIGS. 11-13.

Referring now to (105), in more detail, the second sensor may acquire, within a predetermined period of time from the acquisition of the first image, a second image of the eye (105). The second image may include the same region of interest, e.g., the iris region of the eye. The second sensor may acquire the second image of the eye while illuminated by the first illuminator. The second sensor may acquire the second image within a short period from the first image, e.g., within 200 ms, 50 ms, 10 ms or some other value. The second sensor may acquire, simultaneous with the acquisition of the first image, the second image of the eye. For example, the second sensor may capture the second image responsive to the triggering of the first image capture. The time for capturing the second image may overlap or substantially overlap that of the first image. The first and second sensor may capture the first and second images in synchronization with a flash or strobe of the first illuminator. Simultaneous capture of the first and second images may ensure that a subject (and its region of interest) in motion does not exit a capture volume of the biometric acquisition device between acquisition of the two images. The biometric acquisition device may select and/or combine portions of the two images for biometric verification.

In some embodiments, the first sensor acquires a third image of the eye while illuminated by a second illuminator. The second illuminator may be disposed at a predefined distance from the first illuminator, for example as described above in connection with FIGS. 2, 3B, 4-9 and 13, or any combination thereof. The first sensor may acquire, within a predetermined time from the acquisition of the first image, a third image of the eye. The first sensor may acquire the third image when the first illuminator is turned off and the second illuminator turned on. The first sensor may acquire the third image within a short period of time from the first image, e.g., within 200 ms, 50 ms, 10 ms or some other value. The second illuminator may be disposed at a vertical distance from the first illuminator. The second illuminator may be disposed at a horizontal distance from the first illuminator. The second illuminator may be disposed at a vertical and/or horizontal distance from the first illuminator.

In some embodiments, the second sensor acquires a fourth image of the eye while illuminated by the second illuminator. The second sensor may acquire the fourth image within a predetermined period of time from the acquisition of the third image. The second sensor may acquire the fourth image simultaneous with the acquisition of the third image, e.g., in synchronization with the second illuminator. The biometric acquisition device may acquire and/or store the one or more images (e.g., the first, second, third and fourth images) for batch processing. The biometric acquisition device may acquire and/or store the one or more images in an open loop process, i.e., without feedback, based on analysis of one or more images initially acquired, to trigger acquisition of later/additional image(s). The biometric acquisition device may acquire and/or store the plurality of images to improve or maximize the likelihood that one or more of these images may be free from artifacts within a region of interest.

Referring now to (107), in more detail, an image processor may determine if at least one of the first and second images include artifacts arising from one or both of the first illuminator and eyewear, within the region of interest. The biometric acquisition device may incorporate an image processor, or may be in communication with the image processor. The image processing may perform any of the processing discussed above in connection with FIGS. 26-27. The image processor may determine if at least one of the first and second images include specular reflection off the eyewear within the region of interest. The specular reflection may arise from the first illuminator, which is reflected (e.g., as glare, light saturation, distortion) off a lens of the eyewear worn over the eye. Due to the curvature of the eyewear or lens surface(s), the specular reflection may be magnified, and may extend over a significant portion of the lens as well as over an acquired image of the eye region(s). In some embodiments, the specular reflection extends across one or both eye regions, which may be acquired by the same sensor in one image. The image processor may determine the presence of a specular reflection, which may be identified as an artifact arising from the presence of eyewear and/or a corresponding illuminator.

In certain embodiments, the image processor determines if at least one of the first and second images include at least one of: obstruction from a non-lens portion of the eyewear, discontinuity in a lens of the eyewear, and distortion from a rim of the lens. Obstruction from a non-lens portion of the eyewear may include obstruction (e.g., of the iris) by a spectacle frame, tint coloring, labeling, etching, etc. Discontinuity in a lens of the eyewear may include, for example, a transition between portions of a bifocal lens, lens scratching, cracks on the lens, debris/dirt on the lens, etc. Distortion from a rim of the lens may include roughen edges of the lens at the rim, pronounced curvature in the lens, etc. The image processor may determine the presence of such obstructions, discontinuities and/or distortion, and may identify these as image artifacts arising from the use or presence of eyewear.

In some embodiments, the image processor may select, based on the determination, at least a portion of the region of interest, from one or both of the first and second images, for use in biometric verification. Although the first and second images may sometimes be referenced in certain processing steps for purposes of illustration, any group of images, which may include the third, fourth or any other images, may be considered in the selection and/or subsequent combination.

The selection of one or more portions of a region of interest across one or more images may be based on one or more selection criteria. For example, the image processor may select a best image or suitable portion based on a match score, which may indicate an ability to match to a quality enrolled image or biometric template. the image processor may select a best image or suitable portion based on a quality score, which may be defined by features or characteristics in an image appearing consistent or similar to biometric features (e.g., an iris, rather than a portion of the eyewear).

In certain embodiments, the image processor may rely on edge detection to determine the boundary of a region of interest, for example, to identify the presence of biometric features on which selection criteria may be applied. The image processor may determine from the edge detection whether the boundary is occluded or distorted by artifacts. The image processor may use intensity thresholds to detect artifacts, such as saturated regions due to specular reflection or the presence of illuminated dirt. The image processor may determine that one of the first and second images includes artifacts within the region of interest, and may select the other image for biometric verification purposes. The image processor may determine that one or more of the images are free from artifacts and usable for biometric verification. The image processor may determine that all of the images include one or more artifacts within the region of interest. In some embodiments, the image processor may select a portion of the area of interest while excluding another portion that has a detected artifact, for partial biometric verification.

In certain embodiments, the image processor may combine the one or more portions of the region of interest selected, for biometric verification. For example, the image processor may select portions of the region of interest, from both the first and second images, to be combined into an image for biometric verification. Portions from any one or more of the first, second, third and fourth images may be selected, and combined (e.g., patched or stitched together, or arranged in a data structure). The image processor may select or extract biometric information from portions of the region of interest, for combination or stitching, for later use in biometric verification.

In another aspect, the present disclosure is directed to a method of acquiring artifact-free biometric images of an eye, for example as described above in connection with FIGS. 21-24. The targeted eye or eyes may be in relative motion with a first sensor, and in the presence of partially-reflective eyewear worn over the eye(s). The method may include acquiring, by a first sensor, a first image of an eye while the eye is in a first position relative to the sensor and illuminated by a first illuminator (203). The first image may include a region of interest. The first sensor may be disposed at a fixed displacement from the first illuminator. The first sensor may acquire, within a predetermined time from the acquisition of the first image, a second image of the eye while the eye is in a second position and illuminated by the first illuminator (205). The second image may include the region of interest. An image processor may determine if at least one of the first and second images include artifacts arising from one or both of the first illuminator and eyewear, within the region of interest (207). The image processor may select, based on the determination, at least a portion of the region of interest, from one or both of the first and second images, for use in biometric verification (209).

In this aspect, single-sensor operation may occur within the context of the method and/or system of FIG. 28. As such, some of the method steps may incorporate any of the steps, features or processes described above in connection with, or adapted from FIG. 28. The single-sensor operation may leverage on any embodiment of a single or multiple-sensor system described in FIGS. 2-28. For example, one of two sensors may be turned off or disabled to practice a single-sensor acquisition method for capturing artifact-free images.

Referring to (203), a first sensor may acquire a first image of an eye while the eye is in a first position relative to the sensor and illuminated by a first illuminator (203). The first image may include a region of interest. The first sensor may be disposed at a fixed displacement from the first illuminator. Step (203) may incorporate any of the steps, features or processes described above in connection with, or adapted from (103). The first sensor may acquire a first image of an eye while the eye is in relative motion with the sensor. The first sensor may acquire the first image of an eye when the eye is in a first orientation or gaze direction with respect to the first sensor. The first sensor may acquire the first image of an eye when the eye at a first distance from the first sensor.

In another aspect, the present systems may be configured to ensure that the motion of a user with respect to a sensor is non-parallel to the optical axis of the sensor. An example of this is shown in FIG. 24. This can be achieved, for example, by locating a sighting or gaze-directing mechanism at a different location from the camera so that the user or the device moves along a line from the eye to the sighting mechanism, rather than a direction along a line from the eye to the camera. For example, the sighting mechanism may be disposed a specific distance from the sensor, such that an optical axis of the sensor and the gaze axis of the user are non-parallel.

When motion of the user with respect to the sensor is parallel to the optical axis of the sensor, this motion may result in zero parallax along the optical axis, and only a small parallax when the direction of motion is near the optical axis, thereby resulting in limited changes or shifts in artifacts captured in images, and a reduced ability to acquire at least some imagery that are free from artifacts.

When the motion of the user with respect to the sensor is non-parallel to the optical axis of the sensor, such motion can result in increased parallax along and near the optical axis in an acquired image sequence, thereby allowing a greater change or shift in artifacts captured in images, and increasing the likelihood of recovering artifact free images.

In some embodiments, the biometric acquisition device includes a means to direct a gaze direction of the subject or the subject's eye(s). This gaze direction means may be positioned at a pre-determined distance from the optical axis of the sensor, such as in-between the first sensor and the first illuminator or above both the optical axis of the sensor and the illuminator. The means may be positioned in-between or at a pre-determined distance from the one or more sensors and one or more illuminators (e.g., the first and second illuminators). The means may include a module, such as an attention module, which may include any one or more of a light, screen, a label, a marking, a display, a moving part, or any combination thereof. This means may sometimes be referred to as a gaze director or a sighting mechanism. The sighting mechanism may comprise a truncated, hollow cone or other 3D shape located in or on the biometric acquisition device, with the axis of the hollow cone or other 3D shape pointing to the user. Parallax between a visible far edge and a visible near edge of the cone or other 3D shape causes the far and near edges to appear concentric only when viewed directly along the axis of the cone or other 3D shape, thereby providing a means to control the specific angle at which a user looks at the gaze position, which in turn defines a line between the eye and the gaze director. A mirror located at the gaze position at a particular orientation also has the property of defining both a gaze position and a gaze direction, governed by the angle of the mirror, when the user is able to observe their eye in the mirror. This mirror may be co-located at or near the sensor in order to reduce space on a device, but tilted at an angle to ensure that the motion of the user with respect to the sensor is non-parallel to the optical axis of the sensor.

In various embodiments, the first sensor (and/or additional sensors) and the first illuminator (and/or additional illuminators) can located anywhere on a biometric acquisition system or device. The first sensor (and/or additional sensors) may be positioned above and/or to a side, relative to the first illuminator (and/or additional illuminators). The first illuminator (and/or additional illuminators) positioned below and/or to a side respectively. Such an arrangement may prevent shadows from eyelashes from the upper eyelids from being silhouetted or cast onto the iris or the region of interest. This maybe advantageous since the optical axis of the sensor may no longer be parallel to the motion of the user as they move closer to each other, which increases the magnitude of parallax resulting from the motion of the relative motion, thereby increasing the likelihood that iris texture may be revealed under the eyewear at least at one point in an imaging sequence. Accordingly, some embodiments of the biometric acquisition system may ensure that a direction of motion of a corresponding subject relative to the first sensor is non-parallel to, or deviates from the first sensor's optical axis.

Referring to (205), the first sensor may acquire, within a predetermined time from the acquisition of the first image, a second image of the eye while the eye is in a second position and illuminated by the first illuminator. The second image may include the region of interest. The first sensor may acquire the second image of an eye while the eye is in relative motion with the first sensor. The first sensor may acquire the second image of an eye when the eye is in a second, different orientation or gaze direction with respect to the first sensor. The first sensor may acquire the second image of an eye when the eye is in closer proximity with, or further away from the first sensor.

In some embodiments, the second sensor acquires a third image of the eye while illuminated by the first illuminator, for example, similar to that discussed above in connection with (105). The second sensor may be vertically displaced with respect to the first sensor. The second sensor may acquire, within a predetermined time from the acquisition of the third image, a fourth image of the eye while illuminated by the first illuminator. The first sensor may acquire a third image of the eye while illuminated by a second illuminator, for example, similar to that discussed above in connection with (105). The second illuminator may be disposed at a predefined distance from the first illuminator. The first sensor may acquire, within a predetermined time from the acquisition of the first image, a third image of the eye while illuminated by a second illuminator. The second illuminator may be disposed at a vertical distance from the first illuminator.

Referring to (207), an image processor may determine if at least one of the first and second images include artifacts arising from one or both of the first illuminator and eyewear, within the region of interest. Step (207) may incorporate any of the steps, features or processes described above in connection with (107).

Referring to (209), and in more details, the image processor may select, based on the determination, at least a portion of the region of interest, from one or both of the first and second images, for use in biometric verification. Step (209) may incorporate any of the steps, features or processes described above in connection with (107) and FIGS. 26-27, pertaining to the processing of one or more images. For example, the image processor may select, based on the determination, at least a portion of the region of interest, from one or both of the first and second images, for use in biometric verification. The image processor may combine the at least a portion of the region of interest selected, for biometric verification. The image processor may determine if at least one of the first and second images include specular reflection off the eyewear within the region of interest, the specular reflection arising from the first illuminator. The image processor may determine if at least one of the first and second images include at least one of: obstruction from a non-lens portion of the eyewear, discontinuity in a lens of the eyewear, and distortion from a rim of the lens.

Having described certain embodiments of the methods and systems, it will now become apparent to one of skill in the art that other embodiments incorporating the concepts of the invention may be used. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed:

1. A method of acquiring artifact-free biometric images of an eye in relative motion with a sensor, and in the presence of partially-reflective eyewear, the method comprising:
    (a) acquiring, by a first sensor having a first optical axis, a first image of an eye while the eye is illuminated by a first illuminator, the first image including a region of interest, the first sensor disposed at a fixed displacement from the first illuminator and a second sensor disposed at a separation distance S from the first sensor and having a second optical axis;
    (b) acquiring, by the second sensor within a predetermined period of time from the acquisition of the first image, a second image of the eye, the second image including the region of interest; and
    (c) determining if at least one of the first and second images include artifacts arising from one or both of the first illuminator and eyewear, within the region of interest, wherein the first optical axis and the second optical axis converge at a distance D between the eye and a midpoint between the first sensor and the second sensor and the first sensor and the second sensor are substantially at or below an angle of arcTan(0.5*S/D) from a line connecting the eye and the midpoint between the first sensor and second sensor.

2. The method of claim 1, wherein (a) comprises acquiring, by the first sensor, the first image of the eye while illuminated by the first illuminator, the first sensor vertically displaced with respect to the second sensor.

3. The method of claim 1, wherein (b) comprises acquiring, by the second sensor simultaneous with the acquisition of the first image, the second image of the eye, the second image including the region of interest.

4. The method of claim 1, further comprising acquiring, by the first sensor, a third image of the eye while illuminated by a second illuminator, the second illuminator disposed at a predefined distance from the first illuminator.

5. The method of claim 1, further comprising acquiring, by the first sensor within a predetermined time from the acquisition of the first image, a third image of the eye while illuminated by a second illuminator, the second illuminator disposed at a vertical distance from the first illuminator.

6. The method of claim 5, further comprising acquiring, by the second sensor, a fourth image of the eye while illuminated by the second illuminator.

7. The method of claim 1, further comprising selecting, based on the determination, at least a portion of the region of interest, from one or both of the first and second images, for use in biometric verification.

8. The method of claim 7, further comprising combining the at least a portion of the region of interest selected, for biometric verification.

9. The method of claim 1, wherein (c) comprises determining if at least one of the first and second images include specular reflection off the eyewear within the region of interest, the specular reflection arising from the first illuminator.

10. The method of claim 1, wherein (c) comprises determining if at least one of the first and second images include at least one of: obstruction from a non-lens portion of the eyewear, discontinuity in a lens of the eyewear, and distortion from a rim of the lens.

11. A system of acquiring artifact-free biometric images of an eye in relative motion with a sensor, and in the presence of partially-reflective eyewear, the system comprising:
a first illuminator;
a first sensor having a first optical axis and a second sensor disposed at a separation distance S and having a second optical axis, the first sensor acquiring a first image of an eye while illuminated by a first illuminator,
the first image including a region of interest, the first sensor disposed at a fixed displacement from the first illuminator and the second sensor,
the second sensor acquiring a second image of the eye within a predetermined period of time from the acquisition of the first image, the second image including the region of interest; and
an image processor determining if at least one of the first and second images include artifacts arising from one or both of the first illuminator and partially reflective eyewear, within the region of interest,
wherein (i) the first optical axis and the second optical axis converge at a distance D between the eye and a midpoint between the first sensor and the second sensor and (ii) the first sensor and the second sensor are substantially at or below an angle of arcTan(0.5*S/D) from a line connecting the eye and the midpoint between the first sensor and second sensor.

12. The system of claim 11, wherein the first sensor is vertically displaced with respect to the second sensor.

13. The system of claim 11, wherein the second sensor acquires, simultaneous with the acquisition of the first image, the second image of the eye.

14. The system of claim 11, wherein the first sensor acquires a third image of the eye while illuminated by a second illuminator, the second illuminator disposed at a predefined distance from the first illuminator.

15. The system of claim 11, further comprising a second illuminator, the first sensor acquiring, within a predetermined time from the acquisition of the first image, a third image of the eye while illuminated by the second illuminator, the second illuminator disposed at a vertical distance from the first illuminator.

16. The system of claim 15, wherein the second sensor acquires a fourth image of the eye while illuminated by the second illuminator.

17. The system of claim 11, wherein the image processor selects, based on the determination, at least a portion of the region of interest, from one or both of the first and second images, for use in biometric verification.

18. The system of claim 17, wherein the image processor combines the at least a portion of the region of interest selected, for biometric verification.

19. The system of claim 11, wherein the image processor determines if at least one of the first and second images include specular reflection off the eyewear within the region of interest, the specular reflection arising from the first illuminator.

20. The system of claim 11, wherein the image processor determines if at least one of the first and second images include at least one of: obstruction from a non-lens portion of the eyewear, discontinuity in a lens of the eyewear, and distortion from a rim of the lens.

\* \* \* \* \*